United States Patent
Li et al.

(10) Patent No.: US 10,374,763 B2
(45) Date of Patent: Aug. 6, 2019

(54) PARAMETER TRANSMISSION METHOD AND DEVICE FOR INTERFERENCE COORDINATION, AND INTERFERENCE COORDINATION METHOD AND DEVICE

(71) Applicant: ZTE Corporation, Shenzhen (CN)

(72) Inventors: Yu Ngok Li, Shenzhen (CN); Jun Xu, Shenzhen (CN); Yunfeng Sun, Shenzen (CN); Senbao Guo, Shenzhen (CN); Junfeng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 129 days.

(21) Appl. No.: 15/024,985

(22) PCT Filed: May 15, 2014

(86) PCT No.: PCT/CN2014/077587
§ 371 (c)(1),
(2) Date: Mar. 25, 2016

(87) PCT Pub. No.: WO2014/183660
PCT Pub. Date: Nov. 20, 2014

(65) Prior Publication Data
US 2016/0218840 A1    Jul. 28, 2016

(30) Foreign Application Priority Data
Sep. 26, 2013 (CN) .......................... 2013 1 0446299

(51) Int. Cl.
*H04L 5/00* (2006.01)
*H04W 72/08* (2009.01)
(Continued)

(52) U.S. Cl.
CPC .......... *H04L 5/0033* (2013.01); *H04L 5/0035* (2013.01); *H04L 5/0053* (2013.01);
(Continued)

(58) Field of Classification Search
CPC .............. H04W 72/08; H04W 72/082; H04W 72/0446; H04W 28/18; H04L 5/0033; H04L 5/0053; H04L 5/0094; H04L 5/0035
See application file for complete search history.

(56) References Cited

U.S. PATENT DOCUMENTS

2012/0033570 A1\* 2/2012 He .................. H04L 5/001
370/252
2012/0331478 A1\* 12/2012 Zhu .................. H04W 72/0486
718/104
(Continued)

FOREIGN PATENT DOCUMENTS

CN    101789849 A    7/2010
CN    101795471 A    8/2010
(Continued)

OTHER PUBLICATIONS

International Search Report for corresponding application PCT/CN2014/077587 filed on May 15, 2014; dated Aug. 13, 2014.
(Continued)

*Primary Examiner* — Jianye Wu
(74) *Attorney, Agent, or Firm* — Cantor Colburn LLP

(57) ABSTRACT

Provided are a parameter transmission method and device for interference coordination and an interference coordination method and device. The parameter transmission method includes that: a first Transmission Point (TP) specifies a part of resources in all available resources of the first TP; the first TP defines a set of shared parameters on the specified part of resources, wherein the set of shared parameters are used for performing interference coordination between the first TP and at least one second TP adjacent to the first TP; and the first TP sends the set of shared parameters to the at least one second TP. According to the technical solutions, space-
(Continued)

domain Inter-Cell Interference Coordination (ICIC) may be adopted on the basis of a conventional ICIC technology to further enhance a capability of interference coordination between TPs.

22 Claims, 7 Drawing Sheets

(51) Int. Cl.
  *H04W 72/04* (2009.01)
  *H04W 28/18* (2009.01)
  *H04L 1/00* (2006.01)

(52) U.S. Cl.
  CPC ......... *H04L 5/0094* (2013.01); *H04W 28/18* (2013.01); *H04W 72/0446* (2013.01); *H04W 72/08* (2013.01); *H04L 2001/0097* (2013.01); *H04W 72/082* (2013.01)

(56) References Cited

U.S. PATENT DOCUMENTS

| | | | | |
|---|---|---|---|---|
| 2013/0343317 | A1* | 12/2013 | Etemad | H04B 7/024 370/329 |
| 2015/0003393 | A1* | 1/2015 | Xia | H04W 72/042 370/329 |
| 2015/0358990 | A1* | 12/2015 | Kovacs | H04W 24/02 370/329 |

FOREIGN PATENT DOCUMENTS

| | | |
|---|---|---|
| CN | 101877856 A | 11/2010 |
| CN | 102017682 A | 4/2011 |
| CN | 102065490 A | 5/2011 |
| CN | 102355292 A | 2/2012 |
| WO | 2013041512 A1 | 3/2013 |

OTHER PUBLICATIONS

Supplemental Search for corresponding application CN 2013104462999 filed Sep. 26, 2013.

* cited by examiner

PARAMETER TRANSMISSION METHOD AND DEVICE FOR INTERFERENCE COORDINATION, AND INTERFERENCE COORDINATION METHOD AND DEVICE

TECHNICAL FIELD

The present disclosure relates to the field of communication, and in particular to a parameter transmission method and device for interference coordination, and an interference coordination method and device.

BACKGROUND

In current wireless communication, if a sender of an Evolved Universal Terrestrial Radio Access Network Node B (E-UTRAN NodeB, abbreviated as eNodeB or eNB) adopts multiple antennae, a spatial multiplexing manner may be adopted to increase a transmission rate, that is, different data is sent at different antenna positions on the same time-frequency resource of the sender, and a receiver (i.e. User Equipment (UE)) may also adopt multiple antennae. Under a normal condition, Multiple Input Multiple Output (MIMO) may have two transmission forms. One transmission form is Single User-MIMO (SU-MIMO) by which all antenna resources are allocated to the same user under an SU condition; while the other transmission form is Multi User-MIMO (MU-MIMO) by which resources of different antenna spaces are allocated to different users under an MU condition and services are provided for multiple users at the same time and on the same carrier by virtue of space division, and by the MU-MIMO transmission form, average throughput of a cell can be effectively improved.

Specifically, SU-MIMO refers to that one user terminal exclusively occupies a physical resource allocated to the user terminal within one transmission interval. MU-MIMO refers to that one user terminal and at least one other user terminal share a physical resource allocated to the user terminal within one transmission interval. A user terminal and other user terminals may share the same physical resource (which may include: a time-frequency resource) in a space division multiple access or space division multiplexing manner.

A network of 3rd Generation Partnership Project (3GPP) Release 8/Release 9/Release 10 (R8/R9/R10) and a subsequent version adopts a flat network architecture. FIG. 1 is a diagram showing a network architecture based on Long Term Evolution (LTE) and subsequent evolution standards according to a related technology. As shown in FIG. 1, eNBs are main bodies of a wireless network, and the entire access network is completely formed by the eNBs, wherein the eNBs may have logic or physical connections between each other according to a requirement, and the eNBs adopt an Internet Protocol (IP) for bottom-layer transmission, and are logically interconnected through X2 interfaces. Such a design manner is mainly used for supporting mobility of UE in the entire network to ensure seamless handover of a user. In addition, the X2 interfaces are also responsible for load bearing and interference management. Each eNB is connected to a System Architecture Evolution (SAE) core network, i.e. an Evolved Packet Core (EPC) network, through an S1 interface.

A series of LTE standards R8/R9/R10 define a UE specific reference signal. The UE specific reference signal is mainly configured for transmission modes 7, 8 and 9, and the UE specific reference signal is embedded only in the resources to which the high-speed Physical Downlink Shared Channel (PDSCH) is mapped for the UEs. A UE specific reference signal may be used to derive the channel estimation for demodulating the data in the corresponding PDSCH resource blocks (RBs). Therefore, a UE specific reference signal is considered to adopt an independent antenna port, and has a specific channel response from an eNB to UE. Such a UE specific reference signal carries UE information, and is sent only on a frequency band occupied by data of UE, therefore it is unnecessary to cover an Orthogonal Frequency Division Multiplexing (OFDM) symbol occupied by a control channel on the time domain.

A typical usage of the UE specific reference signals is to enable beamforming of the data transmissions to specific UEs. For example: a Cell Reference Signal (CRS) is not transmitted through an independent physical antenna, and an eNB may generate a narrow beam in a specific UE direction by virtue of a correlation matrix of a physical antenna unit. Such a beam has a specific signal response between the eNB and the UE, and it is necessary to perform coherent demodulation on beam data by virtue of a UE specific reference signal. Actually, a channel response carried by a UE specific reference signal may be directly understood as a channel matrix combined with a precoding weight.

In standard LTE R8, an Inter-Cell Interference Coordination (ICIC) method is introduced to avoid inter-cell interference. By using such a method, an eNB may calculate Relative Narrowband TX Power (RNTP) to judge whether the interference brought by a certain Physical Resource Block (PRB) exceeds a preset threshold or not. If the interference brought by the PRB exceeds the preset threshold, an adjacent point is notified, through interaction signalling between point, that the corresponding PRB generates serious interference to the adjacent point may be generated through interaction signalling between points; and if the interference brought by the PRB does not exceed the preset threshold, the adjacent point is notified, through the interaction signalling between the points, that the corresponding PRB does not generate relatively serious interference to the adjacent point. RNTP is a value relative to rated output power of the eNB, and therefore is required to be normalized to output power of the eNB. RNTP is exchanged between adjacent eNBs through an X2 interface message. RNTP is an indicator of a proactive downlink ICIC manner. The 3GPP defines RNTP related information by adopting an Information Element (IE) in an X2 application protocol, wherein the RNTP related information may include fields such as RNTP per PRB Bitmap, RNTP threshold, Number of Cell Specific Antenna Ports, P_B and Physical Downlink Control Channel (PDCCH) Interference Impact.

In mobile communication, capacity and data rate of a network may be increased in a specific area by utilizing an irregular network deployment, namely by employing a low-power Pico point as compensation of a Macro point, and such an irregular network belongs to a heterogeneous network. However, simultaneous adoption of the same frequency in different layers will result in serious interlayer interference. In LTE R10 and R11, a concept of Almost Blank Subframe (ABS) is introduced, which is a time-domain ICIC technology, and a main purpose of introducing the ABS is to reduce interference of a Macro point to a terminal of a Pico point in such a manner that the Macro point does not send data or sends the data under low power on the ABS, thereby reducing interference of downlink transmission of the Macro point to an edge terminal of the Pico point. The 3GPP regulates to define ABS related information by adopting an IE in the X2 application protocol, and the ABS related information is exchanged between adjacent eNBs through an X2 interface message, wherein the ABS related information may include fields such as ABS pattern Information Bitmap, Number of Cell Specific Antenna Ports, Measurement Subset Bitmap and ABS inactive.

A coordinated MIMO technology, also called a Coordinated Multiple Point Transmission and Reception (COMP) technology, improves capacity and transmission reliability of wireless links on edges of cells by virtue of coordinated transmission from sending antennae of multiple cells, and may effectively solve the problem of cell edge interference. An important factor which limits system throughput performance of a cellular network is inter-cell interference, particularly for a cell edge user. COMP can coordinate scheduling and transmission of different cells, effectively deal with interference from an adjacent cell and remarkably enhance a data rate of a cell edge user. In order to implement COMP, communication between adjacent cells is required. If adjacent cells are managed by the same eNB, the implementation of COMP does not require standard signalling. However, in adjacent cells controlled by different eNBs, standard signalling is quite important, especially for a multi-manufacturer network. A COMP solution for an ideal backhaul condition is introduced in LTE R11, and a COMP solution for a non-ideal backhaul condition will be researched in future R12.

In the related technology, a conventional (time-domain or frequency-domain) ICIC technology may effectively reduce inter-cell interference, a COMP technology for an ideal backhaul condition may also reduce inter-cell interference, but there is no technical solution simultaneously supporting integration of the conventional ICIC technology and the COMP technology under a non-ideal backhaul condition in a present standard protocol and the related technology.

SUMMARY

The embodiments of the present disclosure provide a parameter transmission method and device for interference coordination and an interference coordination method and device, so as to at least solve the problem that there is no technical solution simultaneously supporting integration of a conventional ICIC technology and a COMP technology under a non-ideal backhaul condition in the related technology.

According to one aspect of the embodiments of the present disclosure, a parameter transmission method for interference coordination is provided.

The parameter transmission method for interference coordination according to the embodiments of the present disclosure may be applied to a first Transmission Point (TP), and the method may include that: the first TP specifies a part of resources in all available resources of the first TP; the first TP defines a set of shared parameters on the specified part of resources, wherein the set of shared parameters may be used for performing interference coordination between the first TP and at least one second TP adjacent to the first TP; and the first TP sends the set of shared parameters to the at least one second TP.

In an example embodiment, the specified part of resources may include one of: a preset subframe set of the first TP, wherein the preset subframe set may be one of: an ABS set and a non-ABS set, and the available resources may be composed of all subframes; all PRBs, of which RNTP values adopt a preset numerical value, of the first TP, wherein the preset numerical value may be 0 or 1, and the available resources may be composed of all available PRBs of the first TP; and one cell, specified by the first TP, in multiple cells belonging to the first TP, wherein the available resources may be composed of all cells belonging to the first TP.

In an example embodiment, the set of shared parameters may be first-type information defined on the ABS set or the non-ABS set by the first TP, wherein the first-type information may include at least one of: N1 antenna port sequence numbers, N2 pieces of scrambling identity information, N3 total numbers of layers and N4 total numbers of antenna ports; where N1, N2, N3 and N4 may all be positive integers more than or equal to 1.

In an example embodiment, the set of shared parameters may be second-type information defined on the ABS set or the non-ABS set by the first TP, wherein the second-type information may include at least one of: N5 Rank Indications (RIs) and N6 Precoding Matrix Indicators (PMIs); where N5 and N6 may both be positive integers more than or equal to 1.

In an example embodiment, the set of shared parameters may be first-type information defined by the first TP on all the PRBs of which the RNTP values adopt the preset numerical value, wherein the first-type information may include at least one of: N1 antenna port sequence numbers, N2 pieces of scrambling identity information, N3 total numbers of layers and N4 total numbers of antenna ports; where N1, N2, N3 and N4 may all be positive integers more than or equal to 1, and the preset numerical value may be 0 or 1.

In an example embodiment, the set of shared parameters may be second-type information defined by the first TP on all the PRBs of which the RNTP values adopt the preset numerical value, wherein the second-type information may include at least one of: N5 RIs and N6 PMIs; where N5 and N6 may both be positive integers more than or equal to 1, and the preset numerical value may be 0 or 1.

In an example embodiment, the set of shared parameters may be first-type information defined by the first TP on the one cell specified by the first TP, wherein the first-type information may include at least one of: N1 antenna port sequence numbers, N2 pieces of scrambling identity information, N3 total numbers of layers and N4 total numbers of antenna ports; where N1, N2, N3 and N4 may all be positive integers more than or equal to 1.

In an example embodiment, the set of shared parameters may be second-type information defined by the first TP on the one cell specified by the first TP, wherein the second-type information may include at least one of: N5 RIs and N6 PMIs; where N5 and N6 may both be positive integers more than or equal to 1.

In an example embodiment, the first TP sends the set of shared parameters to the at least one second TP through an X2 interface.

In an example embodiment, the first TP sends the set of shared parameters to the at least one second TP through an IE item a LOAD INFORMATION message of the X2 interface.

In an example embodiment, the first TP or the second TP may be one of: an eNB, a macro eNB, a pico eNB and a relay station.

According to another aspect of the embodiments of the present disclosure, an interference coordination method is provided.

The interference coordination method according to the embodiments of the present disclosure may be applied to a second TP, and the method may include that: the second TP receives a set of shared parameters from a first TP, wherein the second TP may be adjacent to the first TP, the set of shared parameters may be a parameter information set defined on a specified part of resources after the first TP specifies the part of resources in all available resources of the first TP, and the set of shared parameters may be used for performing interference coordination between the first TP and the second TP; and the second TP schedules a user terminal managed by the second TP according to the set of shared parameters.

In an example embodiment, the specified part of resources may include one of: a preset subframe set of the first TP, wherein the preset subframe set may be one of: an ABS set and a non-ABS set, and the available resources may be composed of all subframes; all PRBs, of which RNTP values adopt a preset numerical value, of the first TP, wherein the preset numerical value may be 0 or 1, and the available resources may be composed of all available PRBs of the first TP; and one cell, specified by the first TP, in multiple cells belonging to the first TP, wherein the available resources may be composed of all cells belonging to the first TP.

In an example embodiment, the set of shared parameters may be information defined on the ABS set or the non-ABS set by the first TP, wherein the information may include at least one of: N1 antenna port sequence numbers, N2 pieces of scrambling identity information, N3 total numbers of layers, N4 total numbers of antenna ports, N5 RIs and N6 PMIs; where N1, N2, N3, N4, N5 and N6 may all be positive integers more than or equal to 1.

In an example embodiment, the set of shared parameters may be information defined by the first TP on all the PRBs of which the RNTP values adopt the preset numerical value, wherein the information may include at least one of: N1 antenna port sequence numbers, N2 pieces of scrambling identity information, N3 total numbers of layers, N4 total numbers of antenna ports, N5 RIs and N6 PMIs; where N1, N2, N3, N4, N5 and N6 may all be positive integers more than or equal to 1, and the preset numerical value may be 0 or 1.

In an example embodiment, the set of shared parameters may be information defined by the first TP on the one cell specified by the first TP, wherein the information may include at least one of: N1 antenna port sequence numbers, N2 pieces of scrambling identity information, N3 total numbers of layers, N4 total numbers of antenna ports, N5 RIs and N6 PMIs; where N1, N2, N3, N4, N5 and N6 may all be positive integers more than or equal to 1.

In an example embodiment, the specified part of resources may be a part of resources with highest power in all the available resources of the first TP, and the step that the second TP schedules the user terminal managed by the second TP according to the set of shared parameters may include that: the second TP selects an ICIC manner from a time-domain or frequency-domain ICIC manner and a space-domain ICIC manner; under a condition that the time-domain or frequency-domain ICIC manner is selected, the second TP does not send data on the specified part of resources or sends data to the user terminal on a part of resources with lowest power in all the available resources of the first TP; and under a condition that the space-domain ICIC manner is selected, the second TP sends data to the user terminal on the specified part of resources, wherein the second TP may avoid use of antenna port sequence numbers or scrambling identity information in the set of shared parameters and precoding matrixes approximately orthogonal to precoding matrixes indicated by precoding weights when sending the data.

In an example embodiment, the part of resources with the highest power may be one of: the non-ABS set, resource blocks with RNTP of 1 and a cell with highest power.

In an example embodiment, the specified part of resources may be the part of resources with the lowest power in all the available resources of the first TP, and the step that the second TP schedules the user terminal managed by the second TP according to the set of shared parameters may include that: the second TP sends data to the user terminal on the specified part of resources, and performs space-domain ICIC processing in a data sending process, wherein the second TP may avoid use of antenna port sequence numbers or scrambling identity information in the set of shared parameters and the precoding matrixes orthogonal to the precoding matrixes indicated by the precoding weights when sending the data.

In an example embodiment, the part of resources with the lowest power may be one of: the ABS set, resource blocks with RNTP of 0 and a cell with lowest power.

In an example embodiment, the second TP may receive the set of shared parameters from the first TP through an X2 interface.

In an example embodiment, the second TP may receive the set of shared parameters from the first TP through an IE item configured in a LOAD INFORMATION message of the X2 interface.

In an example embodiment, the first TP or the second TP may be one of: an eNB, a macro eNB, a pico eNB and a relay station.

According to another aspect of the embodiments of the present disclosure, a parameter transmission device for interference coordination is provided.

The parameter transmission device for interference coordination according to the embodiments of the present disclosure may be applied to a first TP, and the device may include: a specification component, configured to specify a part of resources in all currently available resources of the first TP; a definition component, configured to define a set of shared parameters on the specified part of resources, wherein the set of shared parameters may be used for performing interference coordination between the first TP and at least one second TP adjacent to the first TP; and a sending component, configured to send the set of shared parameters to the at least one second TP.

In an example embodiment, the specified part of resources may include one of: a preset subframe set of the first TP, wherein the preset subframe set may be one of: an ABS set and a non-ABS set, and the available resources may be composed of all subframes; all PRBs, of which RNTP values adopt a preset numerical value, of the first TP, wherein the preset numerical value may be 0 or 1, and the available resources may be composed of all available PRBs of the first TP; and one cell, specified by the first TP, in multiple cells belonging to the first TP, wherein the available resources may be composed of all cells belonging to the first TP.

In an example embodiment, the set of shared parameters may be information defined by the first TP on the specified part of resources, wherein the information may include at least one of: N1 antenna port sequence numbers, N2 pieces of scrambling identity information, N3 total numbers of layers, N4 total numbers of antenna ports, N5 RIs and N6 PMIs; where N1, N2, N3, N4, N5 and N6 may all be positive integers more than or equal to 1.

In an example embodiment, the sending component may be configured to send the set of shared parameters to the at least one second TP through an X2 interface.

In an example embodiment, the first TP or the second TP may be one of: an eNB, a macro eNB, a pico eNB and a relay station.

According to another aspect of the embodiments of the present disclosure, an interference coordination device is provided.

The interference coordination device according to the embodiments of the present disclosure may be applied to a second TP, and the device may include: a receiving component, configured to receive a set of shared parameters from a first TP, wherein the second TP may be adjacent to the first TP, the set of shared parameters may be a parameter information set defined on a specified part of resources after the first TP specifies the part of resources in all available resources of the first TP, and the set of shared parameters may be used for performing interference coordination between the first TP and the second TP; and a scheduling component, configured to schedule a user terminal managed by the second TP according to the set of shared parameters.

In an example embodiment, the specified part of resources may include one of: a preset subframe set of the first TP, wherein the preset subframe set may be one of: an ABS set and a non-ABS set, and the available resources may be composed of all subframes; all PRBs, of which RNTP values adopt a preset numerical value, of the first TP, wherein the preset numerical value may be 0 or 1, and the available resources may be composed of all available PRBs of the first TP; and one cell, specified by the first TP, in multiple cells belonging to the first TP, wherein the available resources may be composed of all cells belonging to the first TP.

In an example embodiment, the set of shared parameters may be information defined by the first TP on the specified part of resources, wherein the information may include at least one of: N1 antenna port sequence numbers, N2 pieces of scrambling identity information, N3 total numbers of layers, N4 total numbers of antenna ports, N5 RIs and N6 PMIs; where N1, N2, N3, N4, N5 and N6 may all be positive integers more than or equal to 1.

In an example embodiment, the scheduling component may include: a selection unit, configured to select an ICIC manner from a time-domain or frequency-domain ICIC manner and a space-domain ICIC manner; a first processing unit, configured to, under a condition that the time-domain or frequency-domain ICIC manner is selected, not send data on the specified part of resources or send data to the user terminal on a part of resources with lowest power in all the available resources of the first TP; and a second processing unit, configured to, under a condition that the space-domain ICIC manner is selected, send data to the user terminal on the specified part of resources, wherein the specified part of resources may be a part of resources with highest power in all the available resources of the first TP, and use of antenna port sequence numbers or scrambling identity information in the set of shared parameters and precoding matrixes approximately orthogonal to precoding matrixes indicated by precoding weights may be avoided when the data is sent.

In an example embodiment, the part of resources with the highest power may be one of: the non-ABS set, resource blocks with RNTP of 1 and a cell with highest power.

In an example embodiment, the scheduling component may include: a third processing unit, configured to send data to the user terminal on the specified part of resources, and perform space-domain ICIC processing in a data sending process, wherein the specified part of resources may be the part of resources with the lowest power in all the available resources of the first TP, and use of antenna port sequence numbers or scrambling identity information in the set of shared parameters and the precoding matrixes orthogonal to the precoding matrixes indicated by the precoding weights may be avoided when the data is sent.

In an example embodiment, the part of resources with the lowest power may be one of: the ABS set, resource blocks with RNTP of 0 and a cell with lowest power.

In an example embodiment, the receiving component may be configured to receive the set of shared parameters from the first TP through an X2 interface.

In an example embodiment, the first TP or the second TP may be one of: an eNB, a macro eNB, a pico eNB and a relay station.

According to the embodiments of the present disclosure, the first TP specifies a part of resources in all available resources of the first TP; the first TP defines a set of shared parameters on the specified part of resources, wherein the set of shared parameters are used for performing interference coordination between the first TP and at least one second TP adjacent to the first TP; and the first TP sends the set of shared parameters to the at least one second TP. By virtue of the technical solution, the problem that there is no technical solution simultaneously supporting integration of the conventional ICIC technology and the COMP technology under the non-ideal backhaul condition in the related technology is solved, and a capability of interference coordination between the TPs is further enhanced by space-domain ICIC on the basis of the conventional ICIC technology.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments can be combined under the condition of no conflicts.

Figure 1:
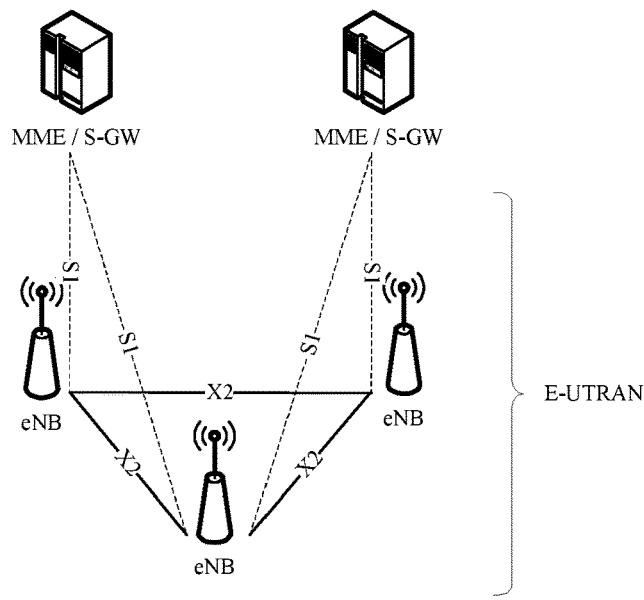
FIG. 1 is a diagram showing a network architecture based on LTE and subsequent evolution standards according to the related technology.
Figure 2:
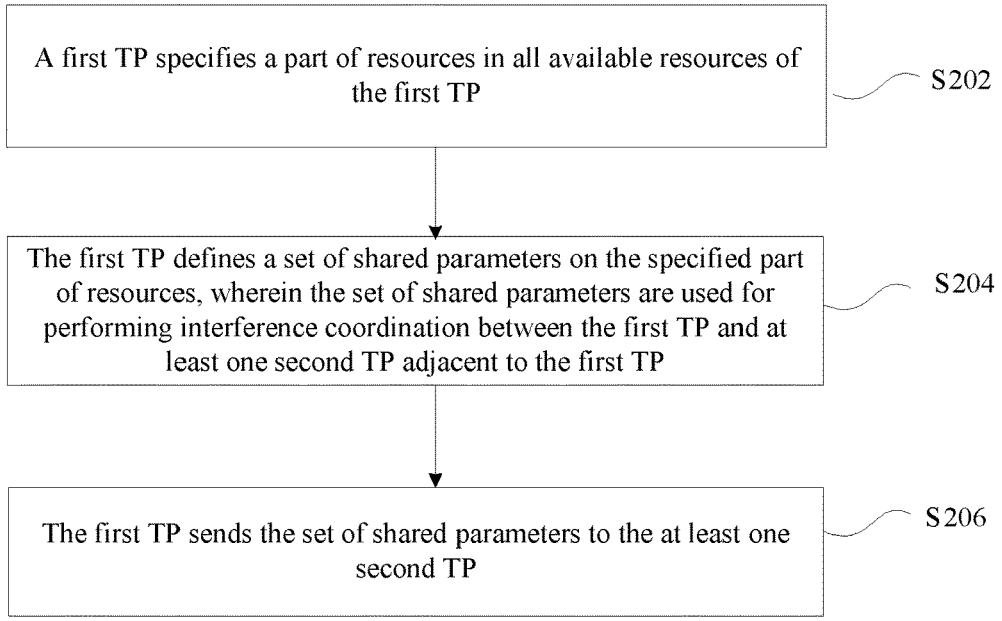
FIG. 2 is a flowchart of a parameter transmission method for interference coordination according to an embodiment of the present disclosure.

FIG. 2 is a flowchart of a parameter transmission method for interference coordination according to an embodiment of the present disclosure. As shown in FIG. 2, the method is applied to a first TP, and may include the following processing steps:

Step S202: the first TP specifies a part of resources in all available resources of the first TP;

Step S204: the first TP defines a set of shared parameters on the specified part of resources, wherein the set of shared parameters may be used for performing interference coordination between the first TP and at least one second TP adjacent to the first TP; and Step S206: the first TP sends the set of shared parameters to the at least one second TP.

In the related technology, there is no technical solution which can simultaneously support integration of a conventional ICIC technology and a COMP technology under a non-ideal backhaul condition. According to the method shown in FIG. 2, the first TP specifies a part of resources in all available resources of the first TP; the first TP defines a set of shared parameters on the specified part of resources, wherein the set of shared parameters are used for performing interference coordination between the first TP and at least one second TP adjacent to the first TP; and the first TP sends the set of shared parameters to the at least one second TP. In this way, the problem that there is no technical solution simultaneously supporting integration of the conventional ICIC technology and the COMP technology under the non-ideal backhaul condition in the related technology is solved, and a capability of interference coordination between the TPs is further enhanced by space-domain ICIC on the basis of the conventional ICIC technology.

In an example embodiment, the specified part of resources may include one of:

(1) a preset subframe set of the first TP, wherein the preset subframe set is one of: an ABS set and a non-ABS set, and the available resources of the first TP are composed of all subframes;

(2) all PRBs, of which RNTP values adopt a preset numerical value, of the first TP, wherein the preset numerical value is 0 or 1, and the available resources of the first TP are composed of all available PRBs of the first TP; and (3) one cell, specified by the first TP, in multiple cells belonging to the first TP, wherein the available resources of the first TP are composed of all cells belonging to the first TP, and each cell actually corresponds to one component carrier in Carrier Aggregation (CA).

In an example embodiment, the set of shared parameters are first-type information (i.e. transmission related information) defined on the ABS set or the non-ABS set by the first TP, wherein the first-type information may include at least one of:

(1) N1 antenna port sequence numbers,
(2) N2 pieces of scrambling identity information,
(3) N3 total numbers of layers, and
(4) N4 total numbers of antenna ports; where N1, N2, N3 and N4 are all positive integers more than or equal to 1.

Such a manner implements organic combination of the conventional time-domain ICIC technology and a semi-static COMP technology (for example: a Coordinated Scheduling/Coordinated Beamforming (CS/CB) technology).

In an example embodiment, the set of shared parameters are second-type information (i.e. channel related information) defined on the ABS set or the non-ABS set by the first TP, wherein the second-type information may include at least one of:

(1) N5 RIs, and
(2) N6 PMIs, wherein the PMIs are configured to indicate precoding matrixes in one codebook;
where N5 and N6 are both positive integers more than or equal to 1.

In an example embodiment, the set of shared parameters are first-type information defined by the first TP on all the PRBs of which the RNTP values adopt the preset numerical value, wherein the first-type information may include at least one of:

(1) N1 antenna port sequence numbers,
(2) N2 pieces of scrambling identity information,
(3) N3 total numbers of layers, and
(4) N4 total numbers of antenna ports;
where N1, N2, N3 and N4 are all positive integers more than or equal to 1, and the preset numerical value is 0 or 1.

In an example embodiment, the set of shared parameters are second-type information defined by the first TP on all the PRBs of which the RNTP values adopt the preset numerical value, wherein the second-type information may include at least one of:

(1) N5 RIs, and
(2) N6 PMIs;
where N5 and N6 are both positive integers more than or equal to 1, and the preset numerical value is 0 or 1.

The preset numerical value is preferably equal to 1 in a homogeneous network because the first TP in the homogeneous network needs to notify an adjacent point of a strong interference resource of the first TP and the adjacent TP needs to avoid scheduling of the strong interference resource to implement interference coordination. While the preset numerical value is preferably equal to 0 in a heterogeneous network because the first TP in the heterogeneous network needs to notify the adjacent point of a weak interference resource of the first TP and the adjacent TP needs to schedule the weak interference resource for downlink transmission to implement interference coordination.

Such a manner implements organic combination of the conventional frequency-domain ICIC technology and the semi-static COMP technology (for example: the CS/CB technology).

In an example embodiment, the set of shared parameters are first-type information defined by the first TP on the one cell specified by the first TP, wherein the first-type information may include at least one of:

(1) N1 antenna port sequence numbers,
(2) N2 pieces of scrambling identity information,
(3) N3 total numbers of layers, and
(4) N4 total numbers of antenna ports; where N1, N2, N3 and N4 are all positive integers more than or equal to 1.

In an example embodiment, the set of shared parameters are second-type information defined by the first TP on the one cell specified by the first TP, wherein the second-type information may include at least one of:

(1) N5 RIs, and
(2) N6 PMIs;

where N5 and N6 are both positive integers more than or equal to 1.

By the abovementioned steps, if TP A (equivalent to the first TP) sends the shared parameters between the points on high-power resources (i.e. resources with highest power in all the available resources of the first TP) to one or more TPs B (equivalent to the one or more second TPs), one or more adjacent TPs B may select, on resources on which there is interference between cells, one of:

(1) different port numbers,
(2) different scrambling identities, and
(3) precoding matrixes which are approximately orthogonal.

In such a way, space orthogonality can be ensured when one or more adjacent TPs in a coordination set perform downlink transmission, thereby avoiding interference to edge users of the TPs, improving frequency multiplexing frequency and simultaneously implementing interference coordination and suppression.

In an example implementation mode of the present disclosure, TP A may send the configured shared parameters to one or more TPs B adjacent to TP A through an X2 interface. Transmission between eNB1 and eNB2 through the X2 interface is limited to one of:

(1) the ABS set or non-ABS set of TP A, wherein the available resources are composed of all the subframes;
(2) all the PRBs, of which the RNTP values adopt the preset numerical value, of TP A, wherein the preset numerical value is 0 or 1, and the available resources are composed of all the available PRBs available of the first TP; and
(3) Demodulation Reference Signal (DMRS) related parameters or channel related information parameters of one cell selected under a condition that TP A is an eNB and the eNB has multiple cells, wherein the available resources are composed of all the cells belonging to the first TP.

In the example embodiment, interfaces of the TP are defined in a unified manner, so that system transmission efficiency is improved. In an example embodiment, the TP may send the shared parameters to the one or more TPs adjacent to the TP through an IE item configured in a LOAD INFORMATION message of the X2 interface. Transmitting the parameters through signalling in the related technology reduces a signalling transmission load.

In the example embodiment, the first TP or each second TP may be one of:

(1) an eNB,
(2) a macro eNB,
(3) a pico eNB, and
(4) a relay station.

In a practical COMP system, multiple network elements, for example: an eNB and a micro cell, an eNB and a pico cell, and a relay station and a Radio Remote Unit (RRU), may perform coordinated transmission so that coverage of a coordination cell is enlarged, and throughput and performance of coordinated transmission are improved.

Figure 3:
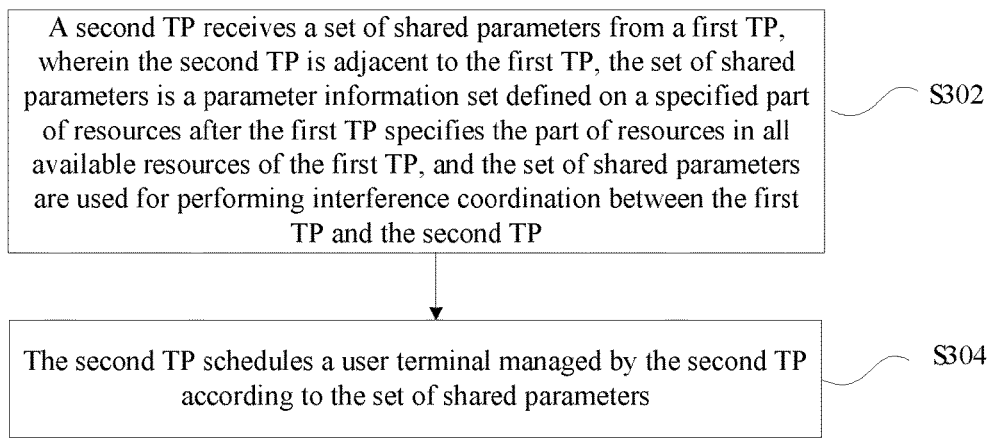
FIG. 3 is a flowchart of an interference coordination method according to an embodiment of the present disclosure.

FIG. 3 is a flowchart of an interference coordination method according to an embodiment of the present disclosure. As shown in FIG. 3, the method is applied to a second TP, and may include the following processing steps:

Step S302: the second TP receives a set of shared parameters from a first TP, wherein the second TP is adjacent to the first TP, the set of shared parameters is a parameter information set defined on a specified part of resources after the first TP specifies the part of resources in all available resources of the first TP, and the set of shared parameters may be used for performing interference coordination between the first TP and the second TP; and Step S304: the second TP schedules a user terminal managed by the second TP according to the set of shared parameters.

By the method shown in FIG. 3, the problem that there is no technical solution simultaneously supporting integration of a conventional ICIC technology and a COMP technology under a non-ideal backhaul condition in the related technology is solved, and a capability of interference coordination between the TPs is further enhanced by space-domain ICIC on the basis of the conventional ICIC technology.

In an example embodiment, the specified part of resources may include one of:

(1) a preset subframe set of the first TP, wherein the preset subframe set is one of: an ABS set and a non-ABS set, and the available resources of the first TP are composed of all subframes;
(2) all PRBs, of which RNTP values adopt a preset numerical value, of the first TP, wherein the preset numerical value is 0 or 1, and the available resources of the first TP are composed of all available PRBs of the first TP; and
(3) one cell, specified by the first TP, in multiple cells belonging to the first TP, wherein the available resources of the first TP are composed of all cells belonging to the first TP, and each cell actually corresponds to a component carrier in CA.

In an example embodiment, the set of shared parameters are information defined on the ABS set or the non-ABS set by the first TP, wherein the information may include at least one of:

(1) N1 antenna port sequence numbers,
(2) N2 pieces of scrambling identity information,
(3) N3 total numbers of layers,
(4) N4 total numbers of antenna ports,
(5) N5 RIs, and
(6) N6 PMIs.

In the above, N1, N2, N3, N4, N5 and N6 are all positive integers more than or equal to 1.

In an example embodiment, the set of shared parameters are information defined by the first TP on all the PRBs of which the RNTP values adopt the preset numerical value, wherein the information may include at least one of:

(1) N1 antenna port sequence numbers,
(2) N2 pieces of scrambling identity information,
(3) N3 total numbers of layers,
(4) N4 total numbers of antenna ports, (5) N5 RIs, and
(6) N6 PMIs.

In the above, N1, N2, N3, N4, N5 and N6 are all positive integers more than or equal to 1, and the preset numerical value is 0 or 1.

In an example embodiment, the set of shared parameters are information defined by the first TP on the one cell specified by the first TP, wherein the information may include at least one of:
(1) N1 antenna port sequence numbers,
(2) N2 pieces of scrambling identity information,
(3) N3 total numbers of layers,
(4) N4 total numbers of antenna ports,
(5) N5 RIs, and
(6) N6 PMIs.

In the above, N1, N2, N3, N4, N5 and N6 are all positive integers more than or equal to 1.

In an example embodiment, the specified part of resources is a part of resources with highest power (i.e. the non-ABS set of TP A, or PRBs with RNTP of 1, or a cell, with highest power, of TP A) in all the available resources of the first TP, and the step that the second TP schedules the user terminal managed by the second TP according to the set of shared parameters may include the following operation that:

Step 1: the second TP selects an ICIC manner from a time-domain or frequency-domain ICIC manner and a space-domain ICIC manner;

Step 2: under a condition that the time-domain or frequency-domain ICIC manner is selected, the second TP does not send data on the specified part of resources or sends data to the user terminal on a part of resources with lowest power in all the available resources of the first TP; and Step 3: under a condition that the space-domain ICIC manner (for example: a CS/CB technology for COMP) is selected, the second TP sends data to the user terminal on the specified part of resources, wherein when sending the data, the second TP avoids use of antenna port sequence numbers or scrambling identity information in the set of shared parameters and precoding matrixes approximately orthogonal to precoding matrixes indicated by precoding weights, wherein the approximately orthogonal precoding matrixes refer to precoding matrixes at shorter chordal distances in one or more precoding matrixes indicated by the PMIs in N sets of parameters.

It is important to note that avoiding the use of antenna port sequence numbers or scrambling identity information in the set of shared parameters and the precoding matrixes approximately orthogonal to the precoding matrixes indicated by the precoding weights when the data is sent is only an example implementation mode provided by the present disclosure. Of course, it may also be implemented in a following way: avoiding the use of antenna port sequence numbers or scrambling identity information in the set of shared parameters or the precoding matrixes approximately orthogonal to the precoding matrixes indicated by the precoding weights when the data is sent is only an example implementation mode provided by the present disclosure.

By the example embodiment, if the first TP A sends the shared parameters between the points on strong interference (high-power) resources to the one or more TPs B adjacent to the TP, a difference of the present embodiment from the conventional ICIC technology is that the one or more adjacent TPs B may also send data on the strong interference resources of the first TP, and specifically, a macro eNB in a heterogeneous network scenario may also send data on a non-ABS set or a high-power cell (component carrier); and an adjacent eNB in a homogeneous network scenario may also send data on PRBs with RNTP of 1, different port numbers or different scrambling identities may be selected, or the precoding matrixes approximately orthogonal to the precoding matrixes indicated by the PMIs may be selected, and then the adjacent TPs may keep their downlink transmission space-orthogonal with downlink transmission of the first TP A, thereby increasing a frequency multiplexing coefficient and simultaneously implementing interference coordination and suppression. Of course, under a condition that space orthogonality may not be ensured to be high enough, the one or more adjacent TPs B may select the conventional time-domain ICIC manner or frequency-domain ICIC manner, and does not send the data on the strong interference (or easily interfered) resources of the first TP.

In an example embodiment, the specified part of resources is a part of resources with lowest power (i.e. the ABS set of TP A, or PRBs with RNTP of 0 or a cell, with lowest power, of TP A) in all the available resources of the first TP, and the step that the second TP schedules the user terminal managed by the second TP according to the set of shared parameters may include the following steps:

Step 4: the second TP sends data to the user terminal on the specified part of resources, and performs space-domain ICIC (for example: the CS/CB technology for COMP) processing in a data sending process, wherein the second TP avoids use of antenna port sequence numbers or scrambling identity information in the set of shared parameters and the precoding matrixes orthogonal to the precoding matrixes indicated by the precoding weights when sending the data, wherein the approximately orthogonal precoding matrixes refer to the precoding matrixes with the shorter chordal distances in the one or more precoding matrixes indicated by the PMIs in the N sets of parameters.

By the example embodiment, if the first TP A sends the shared parameters between the points on weak interference (low-power) resources to the one or more TPs B adjacent to the TP, a difference of the present embodiment from the conventional ICIC technology is that the first TP A may send the data (for example: uplink transmission control signaling) by adopting higher power on the weak interference (low-power) resources, the one or more adjacent TPs B also send the data on the weak interference resources of the first TP, and specifically, the macro eNB in the heterogeneous network scenario may also send the data on an ABS set or a low-power cell (component carrier); and the adjacent eNB in the homogeneous network scenario may also send the data on PRBs with RNTP of 0, then inter-cell interference may further be reduced by space-domain ICIC (i.e. the COMP technology), the adjacent TPs may select different port numbers or different scrambling identities, or select the precoding matrixes approximately orthogonal to the precoding matrixes indicated by the PMIs, and then the adjacent TPs may keep their downlink transmission space-orthogonal with downlink transmission of the first TP A, thereby increasing the frequency multiplexing coefficient and simultaneously implementing interference coordination and suppression.

By the abovementioned steps, under a condition that different TPs occupy the same time-frequency resources, different TPs may achieve orthogonality through the space domain, so that the problem of interference among different TPs which are adjacent is solved. In addition, compared with the conventional ICIC technology, such a manner has the advantage that spectral efficiency and system performance of a communication system may be remarkably improved.

It is important to note that the part of resources with the highest power and the part of resources with the lowest power in all the available resources of the first TP may not coexist, and they are alternative.

In an example embodiment, the second TP may receive the set of shared parameters from the first TP through an X2 interface.

In an example implementation process, the second TP may receive the set of shared parameters from the first TP through an IE item configured in a LOAD INFORMATION message of the X2 interface.

In the example embodiment, the first TP or the second TP may be one of:
(1) an eNB,
(2) a macro eNB,
(3) a pico eNB, and
(4) a relay station.

In another example embodiment of the present disclosure, parameter transmission method software for inter-cell interference coordination is further provided, which is configured to execute the technical solution described in the abovementioned example embodiment.

In another example embodiment of the present disclosure, a storage medium is further provided, in which the parameter transmission method software for inter-cell interference coordination is stored, wherein the storage medium may include, but not limited to, one of: a compact disc, a floppy disk, a hard disk and an erasable memory.

The example implementation process will be further described below with reference to example implementation modes shown in FIG. 4 to FIG. 10.

Example Embodiment 1

Figure 4:
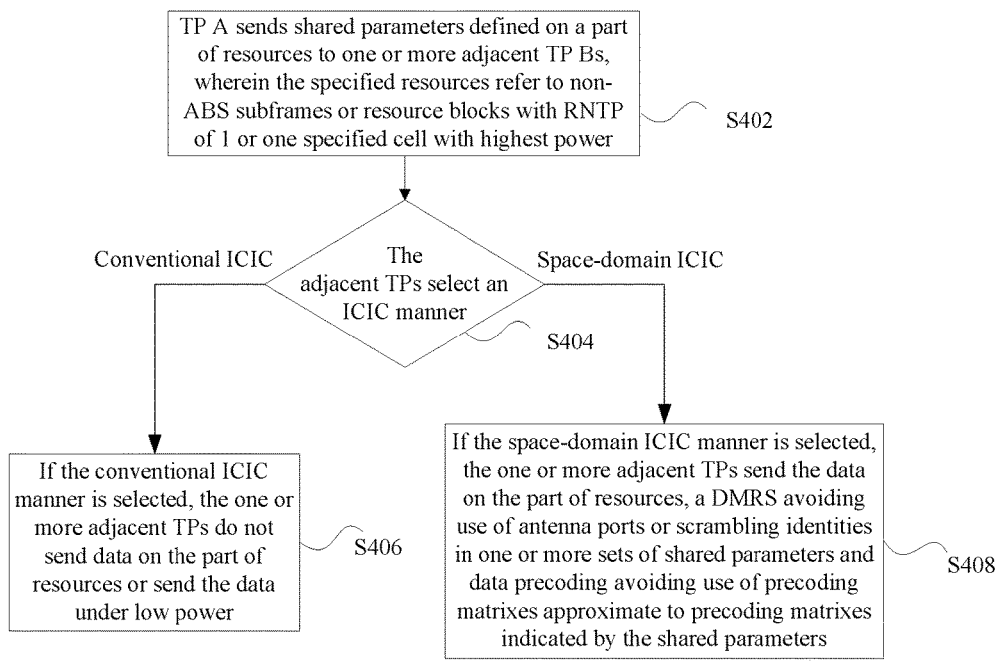
FIG. 4 is a flowchart of a method for message interaction and data processing among multiple eNBs according to an example embodiment of the present disclosure.

The example embodiment provides a method for information interaction among multiple eNBs, and interacted information is high-power or high-interference shared parameters. FIG. 4 is a flowchart of a method for message interaction and data processing among multiple eNBs according to an example embodiment of the present disclosure. As shown in FIG. 4, the flow may include the following steps.

Step S402: in an interference coordination transmission system, TP A sends shared parameters defined on a part of resources with highest power in all available resources of TP A to one or more adjacent TPs B.

In the example embodiment, the shared parameters may be defined on time resources of non-ABSs of TP A, and may include, but not limited to, at least one of:
(1) N1 antenna port sequence numbers,
(2) N2 pieces of scrambling identity information,
(3) N3 total numbers of layers,
(4) N4 total numbers of antenna ports,
(5) N5 RIs, and
(6) N6 PMIs.

In the above, N1, N2, N3, N4, N5 and N6 are all positive integers more than or equal to 1.

In an example embodiment, the shared parameters may be defined on frequency resources of resource blocks, with RNTP of a, of TP A, and may include, but not limited to, at least one of:
(1) N1 antenna port sequence numbers,
(2) N2 pieces of scrambling identity information,
(3) N3 total numbers of layers,
(4) N4 total numbers of antenna ports,
(5) N5 RIs, and
(6) N6 PMIs.

In the above, N1, N2, N3, N4, N5 and N6 are all positive integers more than or equal to 1, and a is 0 or 1.

In an example embodiment, the shared parameters may be defined on one cell, with highest power, selected under a condition that TP A is an eNB and the eNB has multiple cells, and may include, but not limited to, at least one of:
(1) N1 antenna port sequence numbers,
(2) N2 pieces of scrambling identity information,
(3) N3 total numbers of layers,
(4) N4 total numbers of antenna ports,
(5) N5 RIs, and
(6) N6 PMIs.

In the above, N1, N2, N3, N4, N5 and N6 are all positive integers more than or equal to 1.

It is important to note that the shared parameters are not user-specific but cell-specific. The antenna port sequence numbers, the scrambling identity information, the total numbers of layers or the total numbers of UE specific RS ports form a set of parameters independently configured for each TP, and the antenna port sequence numbers, scrambling identity information, total numbers of layers or the total numbers of UE specific RS ports of each user of the TP are not notified to the adjacent TPs through an X2 interface.

In the example implementation process, one of the following manners and any combination of multiple manners may be adopted for the shared parameters.

Manner 1: the shared parameters may be defined on transmission port information of a non-ABS set of TP A, and may include, but not limited to, at least one of:
(1) N1 antenna port sequence numbers,
(2) N2 pieces of scrambling identity information,
(3) N3 total numbers of layers, and
(4) N4 total numbers of antenna ports, wherein the scrambling identity information is nSCID, and its value is 0 or 1; or, the scrambling identity information is $n_{ID}^{nSCID}$ and nSCID, and a value of nSCID is 0 or 1; and the antenna port sequence numbers adopt one or more positive integers from 7 to 15.

In the example implementation process, the following three more specific example implementation modes may be adopted for related information transmitted on the non-ABS set of the TP.

Example implementation mode 1: the related information transmitted on the non-ABS set of the TP is applicable to the entire bandwidth, that is, on the entire bandwidth, the related information may include at least one of:
(1) N1 antenna port sequence numbers,
(2) N2 pieces of scrambling identity information,
(3) N3 total numbers of layers, and
(4) N4 total numbers of antenna ports.

Example implementation mode 2: the related information transmitted on the non-ABS set of the TP is applicable to the entire non-ABS set, that is, in the entire non-ABS set, the related information may include at least one of:
(1) N1 antenna port sequence numbers,
(2) N2 pieces of scrambling identity information,
(3) N3 total numbers of layers, and
(4) N4 total numbers of antenna ports.

Example implementation mode 3: the related information transmitted on the non-ABS set of the TP is applicable to multiple frequency resource groups obtained by dividing the entire bandwidth, and each frequency resource group may include at least one of:
(1) N1 antenna port sequence numbers,
(2) N2 pieces of scrambling identity information,
(3) N3 total numbers of layers, and
(4) N4 total numbers of antenna ports.

Manner 2: the shared parameters are channel related information defined on the non-ABS set of TP A, and may include at least one of:
(1) N5 RIs, and
(2) N6 PMIs.

In the example implementation process, the following four more specific example implementation modes may be adopted for the channel related information on the non-ABS set of the TP.

Example implementation mode 1: the channel related information on the non-ABS set of the TP is applicable to the entire bandwidth, that is, on the entire bandwidth, the channel related information may include at least one of:
(1) N5 RIs, and
(2) N6 PMIs.

Example implementation mode 2: the channel related information on the non-ABS set of the TP is applicable to the entire non-ABS set, that is, in the entire non-ABS set, the channel related information may include at least one of:
(1) N5 RIs, and
(2) N6 PMIs.

Example implementation mode 3: the channel related information on the non-ABS set of the TP is applicable to M frequency resource groups obtained by dividing the entire bandwidth, that is, each frequency resource group may include at least one of:
(1) N5 RIs, and
(2) N6 PMIs,
where values of N5 and N6 are 1 or 2, and M is a positive integer more than or equal to 1.

Example implementation mode 4: the channel related information on the non-ABS set of the TP is applicable to each subframe in the non-ABS set, that is, each subframe may include at least one of:
(1) N5 RIs, and
(2) N6 PMIs.

It is important to note that manner 1 and manner 2 are mainly applied to interference coordination and control of a heterogeneous network, so that organic combination of a conventional time-domain ICIC technology and a semi-static COMP technology (for example: a CS/CB technology) is implemented.

Manner 3: the shared parameters are transmission port information defined on resource blocks, with RNTP of 1, of TP A, and may include, but not limited to, at least one of:
(1) N1 antenna port sequence numbers,
(2) N2 pieces of scrambling identity information,
(3) N3 total numbers of layers, and
(4) N4 UE specific RS total numbers of antenna ports.

In the example implementation process, the following three more specific example implementation modes may be adopted for the channel related information on the resource blocks, with RNTP of 1, of the TP.

Example implementation mode 1: the channel related information on the resource blocks, with RNTP of 1, of the TP is applicable to the entire bandwidth, that is, a set of all PRBs with RNTP of 1 may include at least one of:
(1) N1 antenna port sequence numbers,
(2) N2 pieces of scrambling identity information,
(3) N3 total numbers of layers, and
(4) N4 total numbers of antenna ports.

Example implementation mode 2: the channel related information on the resource blocks, with RNTP of 1, of the TP is applicable to M frequency resource groups obtained by dividing the entire set of the PRBs with RNTP of 1, and each frequency resource group may include at least one of:
(1) N1 antenna port sequence numbers,
(2) N2 pieces of scrambling identity information,
(3) N3 total numbers of layers, and
(4) N4 total numbers of antenna ports,
wherein M is a positive integer more than or equal to 1.

Example implementation mode 3: the channel related information on the resource blocks, with RNTP of 1, of the TP is applicable to each subframe in the non-ABS set, that is, each subframe may include at least one of:
(1) N1 antenna port sequence numbers,
(2) N2 pieces of scrambling identity information,
(3) N3 total numbers of layers, and
(4) N4 total numbers of antenna ports.

Manner 4: the shared parameters are channel related information defined on resource blocks, with RNTP of 1, of the TP, and may include at least one of:
(1) N5 RIs, and
(2) N6 PMIs.

In the example implementation process, the following three more specific example implementation modes may be adopted for the channel related information on the resource blocks, with RNTP of 1, of the TP.

Example implementation mode 1: the channel related information on the resource blocks, with RNTP of 1, of the TP is applicable to the entire bandwidth, that is, a set of all PRBs with RNTP of 1 may include at least one of:
(1) N5 RIs, and
(2) N6 PMIs.

Example implementation mode 2: the channel related information on the resource blocks, with RNTP of 1, of the TP is applicable to M frequency resource groups obtained by dividing the entire set of the PRBs with RNTP of 1, and each frequency resource group may include at least one of:
(1) N5 RIs, and
(2) N6 PMIs,
where values of N5 and N6 are 1 or 2, and M is a positive integer more than or equal to 1.

Example implementation mode 3: the channel related information on the resource blocks, with RNTP of 1, of the TP is applicable to each subframe in the non-ABS set, that is, each subframe may include at least one of:
(1) N5 RIs, and
(2) N6 PMIs,
where values of N5 and N6 are 1 or 2.

It is important to note that such a manner is mainly applied to interference coordination and control of a homogeneous network, and organic combination of a conventional frequency-domain ICIC technology and the semi-static COMP technology (for example: the CS/CB technology) is implemented.

In an example implementation mode of the present disclosure, the TP may send the shared parameters to the adjacent TPs through the X2 interface. In an example embodiment, the TP may send the shared parameters to the corresponding adjacent TPs (coordination cells) through an IE item (indication IE of UE specific RS related parameters) on a LOAD INFORMATION message of the X2 interface.

In another example implementation mode of the present disclosure, the TP may send a UE specific RS related message to the adjacent TPs through a transmission medium such as an optical fibre, a microwave and a cable.

Step S404: one or more adjacent TPs B select an ICIC manner from a conventional ICIC manner and a conventional space-domain ICIC manner (i.e. a COMP technology) according to the shared parameters sent by TP A.

Step S406: if the conventional ICIC manner is selected, one or more adjacent TPs B do not send data on the part of resources with the highest power or send the data on a part of resources, with lowest power, in all the available resources of the first TP.

Step S408: if the space-domain ICIC manner (for example: downlink COMP) is selected, the one or more adjacent TPs send the data on the part of resources with the highest power, but in a data transmission process of the TPs B, use of at least one of the following parameters in the shared parameters should be avoided:

(1) the antenna port sequence numbers;
(2) the scrambling identity information; and
(3) precoding matrixes approximately orthogonal to precoding matrixes indicated by precoding weights.

In the example implementation process, downlink COMP refers to multi-TP CS-CB, Dynamic Point Selection (DPS), Dynamic Point Blank (DPB) or Joint Transmission (JT).

In the example implementation process, each TP may be one of: an eNB, a macro eNB, a pico eNB and a relay station.

By the steps provided by the example embodiment, for a heterogeneous network, an eNB may perform semi-static switching between time-domain ICIC and space-domain ICIC (for example: CS/CB for COMP); for a homogeneous network, the eNB may perform semi-static switching between frequency-domain ICIC and space-domain ICIC (for example: CS/CB for COMP). Therefore, a space-domain ICIC supporting method (i.e. the COMP technology) and an signalling interaction method supporting the function are disclosed on the basis of a conventional eICIC method, and the advantage of improving system spectral efficiency and system performance is achieved. In addition, compatibility with cell-specific shared parameter signalling with lower overhead in a basic design of existing signalling may also be achieved, and the advantages of high compatibility and low signalling overhead are ensured.

Example Embodiment 2

Figure 5:
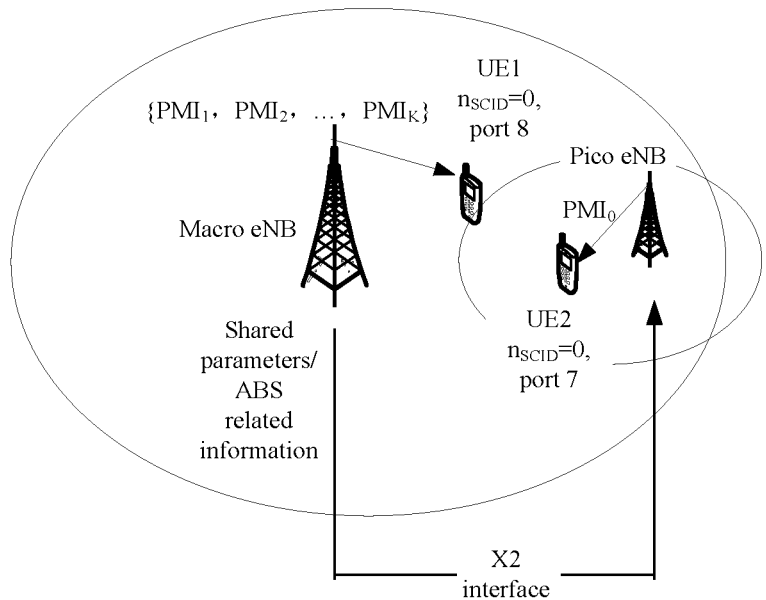
FIG. 5 is a diagram showing adoption of different ports and different precoding matrixes for a macro eNB and a pico eNB on a non-ABS resource in a heterogeneous network according to an example embodiment of the present disclosure.
Figure 6:
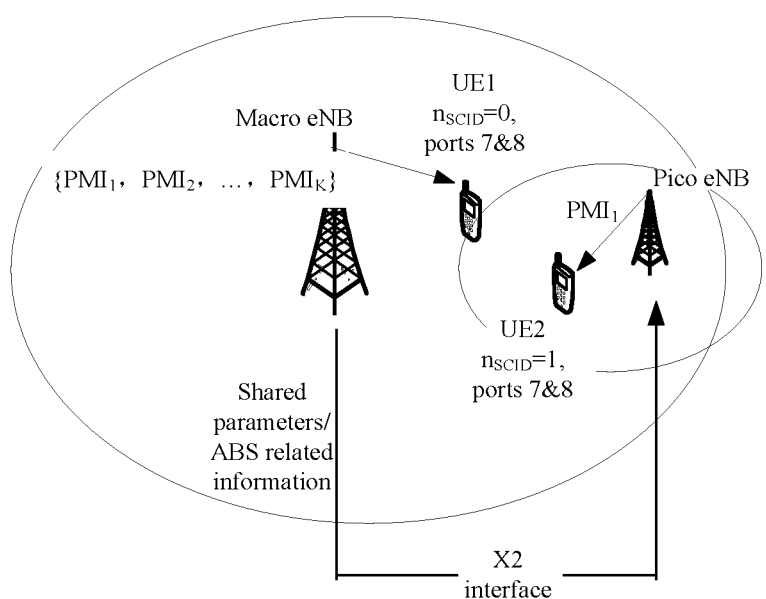
FIG. 6 is a diagram showing adoption of different scrambling identities and different precoding matrixes for a macro eNB and a pico eNB on a non-ABS resource in a heterogeneous network according to an example embodiment of the present disclosure.

The example embodiment provides a method for information interaction and interference control between two eNBs in a heterogeneous network scenario, interacted information is shared parameters of high-power resources, two TPs are a macro TP and a pico TP respectively, and the high-power resources are non-ABS resources of the macro TP. FIG. 5 is a diagram showing adoption of different ports and different precoding matrixes for a macro eNB and a pico eNB on a non-ABS resource in a heterogeneous network according to an example embodiment of the present disclosure. FIG. 6 is a diagram showing adoption of different scrambling identities and different precoding matrixes for a macro eNB and a pico eNB on a non-ABS resource in a heterogeneous network according to an example embodiment of the present disclosure. As shown in FIG. 5 and FIG. 6, port8 is configured for the macro TP to transmit data on non-ABSs, port8 is configured for the pico TP to transmit data on the non-ABSs, $n_{SCID}=0$ is configured for the macro TP to transmit the data on the non-ABSs, and $n_{SCID}=1$ is configured for the pico TP to transmit the data on the non-ABSs. The method may include the following processing steps:

Step 1: in an interference coordination transmission system, a macro TP (TP A) sends shared parameters defined on a part of resources with highest power in all available resources to a pico TP B (i.e. an adjacent TP), wherein the part of resources with the highest power refer to a part of high-interference resources of the corresponding macro TP, i.e. a non-ABS set.

In the example embodiment, the shared parameters may be defined on time resources of non-ABSs of TP A, and may include, but not limited to, at least one of:

(1) N1 antenna port sequence numbers,
(2) N2 pieces of scrambling identity information,
(3) N3 total numbers of layers,
(4) N4 total numbers of antenna ports,
(5) N5 RIs, and
(6) N6 PMIs, where N1, N2, N3, N4, N5 and N6 are all positive integers more than or equal to 1.

In the example implementation process, the shared parameters may include transmission port information defined on the non-ABS set of the macro TP, and may specifically include: antenna port sequence number port=7, scrambling identity information $n_{SCID}=0$ and total layer number v=1 or 2; and in addition, the shared parameters may also include: channel related information defined on the non-ABS set of the macro TP, and may at least include the following contents: RI=1 and PMI including a set {$PMI_1$, $PMI_2$, ..., $PMI_k$} formed by multiple PMIs, wherein $PMI_1$, $PMI_2$, ..., $PMI_k$ are all positive integers more than or equal to 0.

In the example implementation process, the macro TP may send the shared parameters to the adjacent TP (i.e. the pico TP) through an X2 interface.

Step 2: the pico TP (i.e. the adjacent TP) selects an ICIC manner from a conventional ICIC manner and a space-domain ICIC manner (i.e. a COMP technology) according to the shared parameters sent by the macro TP.

The pico TP may select the ICIC manner according to the shared parameters. Specifically, the pico TP judges whether a paired user may be found or not, a spatial channel of the paired user on the non-ABS set being required to be relatively orthogonal to a precoding matrix indicated by a PMI in the shared parameters sent by the macro TP. If the pico TP can find the user consistent with the condition, the space-domain ICIC manner (i.e. CS/CB for the COMP technology) may be selected, otherwise the conventional ICIC manner may be selected. That the spatial channel is relatively orthogonal to the precoding matrix of the shared parameters refers to that their chordal distance is relatively long, for example: the chordal distance is more than 0.7, then the time-frequency resources for the pico TP to send data to the paired user may be overlapped with time-frequency resources for the macro TP to send data to a certain edge user, but they are spatially relatively orthogonal, so that interference may be effectively suppressed, and system multiplexing efficiency may be improved.

Step 3: if the conventional ICIC manner is selected, the pico TP does not send the data on the non-ABS set specified by the macro TP; and if the space-domain ICIC manner (for example: a CS/CB technology for downlink COMP) is selected, the pico TP may send the data on the non-ABS set specified by the macro TP. However, when the pico TP sends the data to the paired user on the non-ABS set specified by the macro TP, the pico TP should avoid use of antenna ports or scrambling identities in the shared parameters, and in addition, when the pico TP sends the data to the paired user, a precoding weight relatively orthogonal to the precoding matrix indicated by the shared parameters is used, and is indicated by $PMI_0$, wherein $PMI_0$ is a positive integer more than or equal to 0.

In the example embodiment, as shown in FIG. 5, when the pico TP sends the data to the paired user on the non-ABS set specified by the macro TP, the macro TP adopts antenna port=8, scrambling identity information $n_{SCID}=0$, total layer number v=1 and PMI {$PMI_1, PMI_2, \ldots, PMI_k$} in the shared parameters for transmission on the non-ABSs; and then the pico TP should avoid use of antenna port=8, the pico TP actually uses antenna port=7, the other DMRS parameters are the same, for example: $n_{SCID}$=0 and total layer number v=1 in the shared parameters, and then it may be ensured that a DMRS of the pico TP and a DMRS of the macro TP are orthogonal to each other on the non-ABS set. In addition, a precoding matrix indicated by $PMI_0$ is relatively orthogonal to a precoding matrix indicated by {$PMI_1, PMI_2, \ldots, PMI_k$} on a specific source subset of the non-ABS set, so that data transmission of the pico TP may be ensured to be relatively orthogonal to data transmission of the macro TP on the non-ABS set, and mutual interference of data transmission of the macro TP and data transmission of the pico TP may be avoided. The other DMRS parameters may further include, but not limited to, at least one of: a support maximum downlink bandwidth, a timeslot number in a radio frame and a frequency-domain index.

In the example embodiment, as shown in FIG. 6, when the pico TP sends the data to the paired user on the non-ABS set specified by the macro TP, the macro TP adopts antenna port=7, antenna port=8, scrambling identity information $n_{SCID}$=0, total layer number v=2 and PMI {$PMI_1, PMI_2, \ldots, PMI_k$} in the shared parameters for transmission on the non-ABSs; then the pico TP should avoid use of scrambling identity information $n_{SCID}$=1, the pico TP actually uses scrambling identity information $n_{SCID}$=0, the other DMRS parameters are the same, for example: antenna port=7 and antenna port=8 are adopted by the two, and then it may be ensured that the DMRS of the pico TP and the DMRS of the macro TP are orthogonal to each other on the non-ABS set. In addition, the precoding matrix indicated by $PMI_0$ is relatively orthogonal to the precoding matrix indicated by {$PMI_1, PMI_2, \ldots, PMI_k$} on the specific source subset of the non-ABS set, so that data transmission of the macro TP may be ensured to be relatively orthogonal to data transmission of the pico TP on the non-ABS set, and mutual interference of data transmission of the macro TP and data transmission of the pico TP may be avoided.

In the example implementation process, downlink COMP refers to multi-TP CS-CB, DPS, PB or JT.

In the example implementation process, each TP may be one of: an eNB, a macro eNB, a pico eNB and a relay station.

By the steps provided by the example embodiment, for a heterogeneous network, an eNB may perform semi-static switching between time-domain ICIC and space-domain ICIC (for example: CS/CB for COMP), so that a space-domain ICIC supporting method (i.e. the COMP technology) and an signalling interaction method supporting the function are disclosed on the basis of a conventional eICIC method, and the advantage of improving system spectral efficiency and system performance is achieved; and in addition, compatibility with cell-specific shared parameter signalling with lower overhead in a basic design of existing signalling may also be achieved, and the advantages of high compatibility and low signalling overhead are ensured.

Example Embodiment 3

Figure 7:
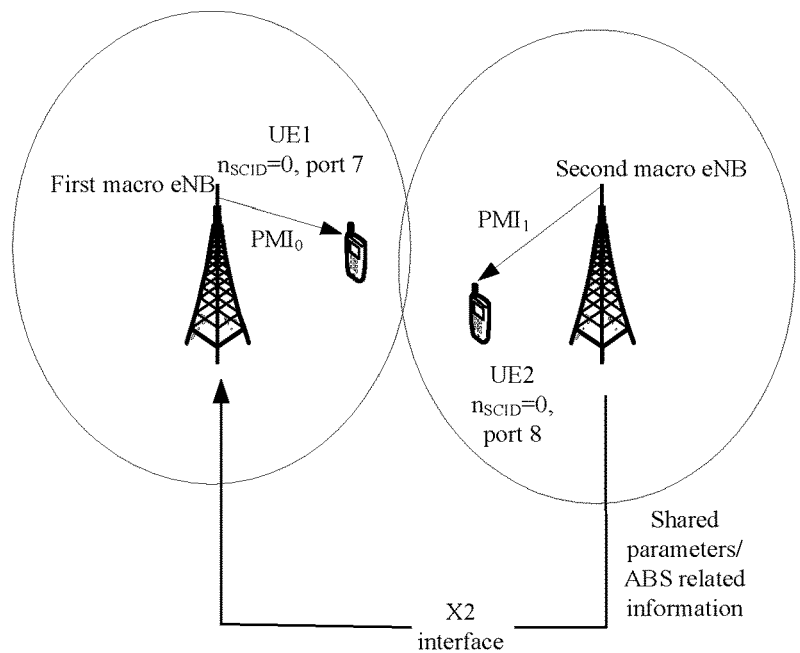
FIG. 7 is a diagram showing adoption of different ports and different precoding matrixes for a macro eNB and a pico eNB on a PRB, with RNTP of 1, in a heterogeneous network according to an example embodiment of the present disclosure.
Figure 8:
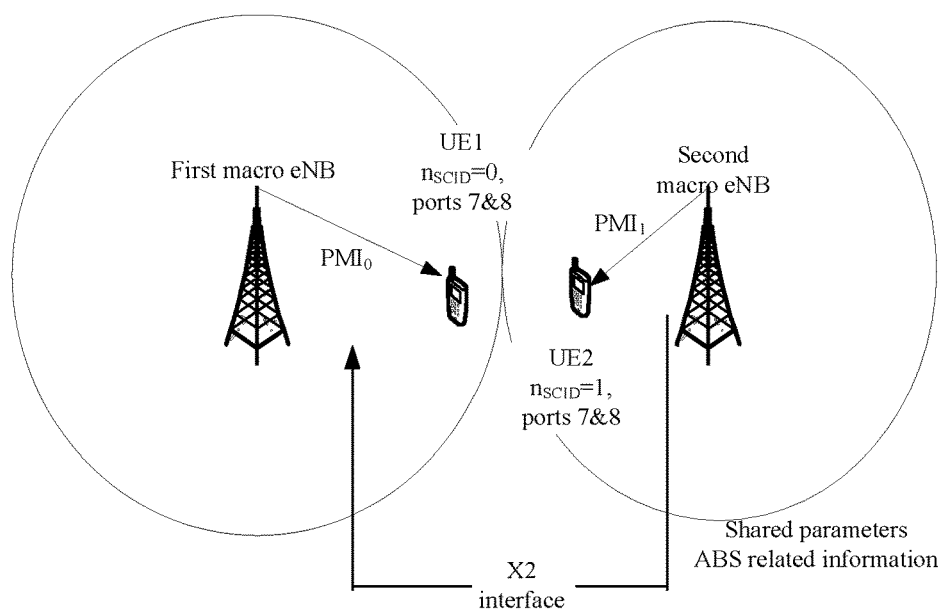
FIG. 8 is a diagram showing adoption of different scrambling identities and different precoding matrixes for a macro eNB and a pico eNB on a PRB, with RNTP of 1, in a heterogeneous network according to an example embodiment of the present disclosure.

The example embodiment provides a method for information interaction and interference control between two eNBs in a homogeneous network scenario, interacted information is shared parameters of high-power resources, two TPs are a first macro TP and a second macro TP respectively, and the high-power resources are all PRBs, with RNTP of 1, of the second macro TP. FIG. 7 is a diagram showing adoption of different ports and different precoding matrixes for a macro eNB and a pico eNB on a PRB, with RNTP of 1, in a heterogeneous network according to an example embodiment of the present disclosure. FIG. 8 is a diagram showing adoption of different scrambling identities and different precoding matrixes for a macro eNB and a pico eNB on a PRB, with RNTP of 1, in a heterogeneous network according to an example embodiment of the present disclosure. As shown in FIG. 7 and FIG. 8, port7 is configured for the first macro TP to transmit data on the PRBs with RNTP of 1, port8 is configured for the second macro TP to transmit data on the PRBs with RNTP of 1, $n_{SCID}$=0 is configured for the first macro TP to transmit the data on the PRBs with RNTP of 1, and $n_{SCID}$=1 is configured for the second macro TP to transmit the data on the PRBs with RNTP of 1. The method may include the following processing steps:

Step 1: in an interference coordination transmission system, a second macro TP (TP A) sends shared parameters defined on a part of resources with highest power in all available resources to a first macro TP B (i.e. an adjacent TP), wherein the part of resources with the highest power refer to a part of high-interference resources of the corresponding second macro TP, i.e. the PRBs with RNTP of 1.

In the example embodiment, the shared parameters may be defined on frequency resources of the PRBs, with RNTP of 1, of the second macro TP, and may include at least one of:
  (1) N1 antenna port sequence numbers,
  (2) N2 pieces of scrambling identity information,
  (3) N3 total numbers of layers,
  (4) N4 total numbers of antenna ports,
  (5) N5 RIs, and
  (6) N6 PMIs,
where N1, N2, N3, N4, N5 and N6 are all positive integers more than or equal to 1.

In the example implementation process, the shared parameters may include transmission port information defined on the PRBs, with RNTP of 1, of the second macro TP, and may include: antenna port sequence number port=7, scrambling identity information $n_{SCID}$=0 and total layer number v=1 or 2; and in addition, the shared parameters may also include: channel related information defined on the PRBs, with RNTP of 1, of the second macro TP, and may at least include the following contents: RI=1 and PMI=$PMI_1$, wherein $PMI_1$ is a positive integer more than or equal to 0.

In an example embodiment, the second macro TP may send the shared parameters to the first macro TP through an X2 interface.

Step 2: the first macro TP (i.e. the adjacent TP) selects an ICIC manner from a conventional ICIC manner and a space-domain ICIC manner (i.e. a COMP technology) according to the shared parameters sent by the second macro TP.

The first macro TP may select the ICIC manner according to the shared parameters. Specifically, the first macro TP judges whether a paired user may be found or not, a spatial channel of the paired user on the PRBs with RNTP of 1 being required to be relatively orthogonal to a precoding matrix indicated by a PMI in the shared parameters sent by the second macro TP. If the first macro TP can find the user consistent with the condition, the space-domain ICIC manner (i.e. CS/CB for the COMP technology) may be selected, otherwise the conventional ICIC manner may be selected. That the spatial channel is relatively orthogonal to the precoding matrix of the shared parameters refers to that their chordal distance is relatively long, for example: the chordal distance is more than 0.7, then the time-frequency resources for the first macro TP to send data to the paired user may be overlapped with time-frequency resources for the second macro TP to send data to a certain edge user, but they are still spatially relatively orthogonal, so that interference may be effectively suppressed, and system multiplexing efficiency may be improved.

Step 3: if the conventional ICIC manner is selected, the first macro TP does not send the data on the PRBs, with RNTP of 1, specified by the second macro TP or sends the data to a part of resources with lowest power in all the available resources of the first TP; and if the space-domain ICIC manner (for example: a CS/CB technology for downlink COMP) is selected, the first macro TP may send the data on the PRBs, with RNTP of 1, specified by the second macro TP. However, when the first macro TP sends the data to the paired user on the PRBs, with RNTP of 1, specified by the second macro TP, the first macro TP should avoid use of antenna ports or scrambling identities in the shared parameters, and in addition, when the first macro TP sends the data to the paired user, a precoding weight relatively orthogonal to the precoding matrix indicated by the shared parameters is used, and is indicated by $PMI_0$, wherein $PMI_0$ is a positive integer more than or equal to 0.

In the example embodiment, as shown in FIG. 7, when the first macro TP sends the data to the paired user on the PRBs, with RNTP of 1, specified by the second macro TP, the second macro TP adopts antenna port=8, scrambling identity information $n_{SCID}$=0, total layer number v=1 and PMI $\{PMI_1, PMI_2, \ldots, PMI_k\}$ in the shared parameters; and the first macro TP should avoid use of antenna port=8, the first macro TP actually uses antenna port=7, the other DMRS parameters are the same, for example: $n_{SCID}$=0 and total layer number v=1 in the shared parameters, and then it may be ensured that a DMRS of the first macro TP and a DMRS of the second macro TP are orthogonal to each other on the PRBs with RNTP of 1. In addition, a precoding matrix indicated by $PMI_0$ is relatively orthogonal to a precoding matrix indicated by $\{PMI_1, PMI_2, \ldots, PMI_k\}$ on a specific source subset of the PRBs with RNTP of 1, so that data transmission of the first macro TP may be ensured to be relatively orthogonal to data transmission of the second macro TP on the PRBs with RNTP of 1, and interference of data transmission of the first macro TP to data transmission of the second macro TP may be avoided. The other DMRS parameters may further include: a support maximum downlink bandwidth, a timeslot number in a radio frame and a frequency-domain index.

In the example embodiment, as shown in FIG. 8, when the first macro TP sends the data to the paired user on the PRBs, with RNTP of 1, specified by the second macro TP, the second macro TP adopts antenna port=7, antenna port=8, scrambling identity information $n_{SCID}$=0, total layer number v=2 and PMI $\{PMI_1, PMI_2, \ldots, PMI_k\}$ in the shared parameters; then the first macro TP should avoid use of scrambling identity information $n_{SCID}$=1 in the shared parameters, the first macro TP actually uses scrambling identity information $n_{SCID}$=0, the other DMRS parameters are the same, for example: antenna port=7 and antenna port=8 are adopted by the two, and then it may be ensured that the DMRS of the first macro TP and the DMRS of the second macro TP are orthogonal to each other on the PRBs with RNTP of 1. In addition, the precoding matrix indicated by $PMI_0$ is relatively orthogonal to the precoding matrix indicated by $\{PMI_1, PMI_2, PMI_k\}$ on the specific source subset of the PRBs with RNTP of 1, so that data transmission of the first macro TP may be ensured to be relatively orthogonal to data transmission of the second macro TP on the PRBs with RNTP of 1, and interference of data transmission of the first macro TP to data transmission of the second macro TP may be avoided.

In the example implementation process, downlink COMP refers to multi-TP CS-CB, DPS, PB or JT.

In the example implementation process, each TP may be one of: an eNB, a macro eNB, a pico eNB and a relay station.

By the steps provided by the example embodiment, for a heterogeneous network, an eNB may perform semi-static switching between frequency-domain ICIC and space-domain ICIC (for example: CS/CB for COMP), so that a space-domain ICIC supporting method (i.e. the COMP technology) and an signalling interaction method supporting the function are disclosed on the basis of a conventional eICIC method, and the advantage of improving system spectral efficiency and system performance is achieved; and in addition, compatibility with cell-specific shared parameter signalling with lower overhead in a basic design of existing signalling may also be achieved, and the advantages of high compatibility and low signalling overhead are ensured.

Example Embodiment 4

Figure 9:
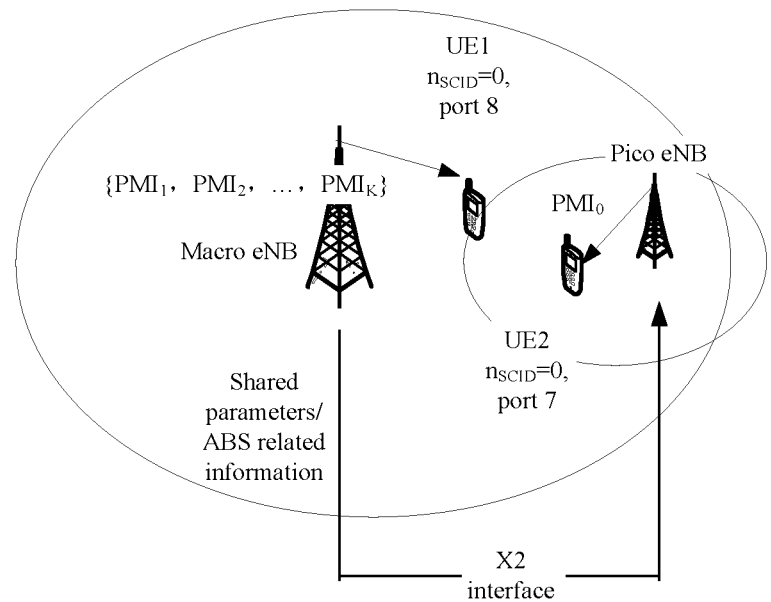
FIG. 9 is a diagram showing adoption of different ports and different precoding matrixes for a macro eNB and a pico eNB on an ABS resource in a heterogeneous network according to an example embodiment of the present disclosure.
Figure 10:
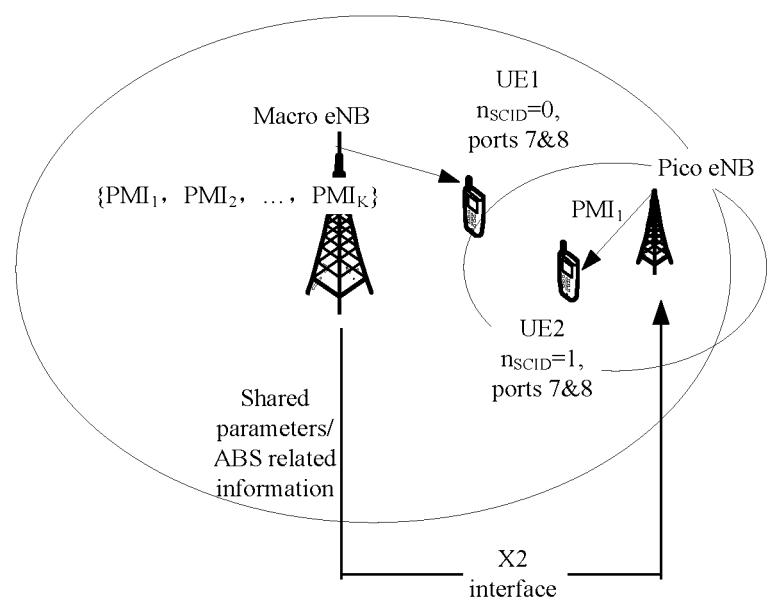
FIG. 10 is a diagram showing adoption of different scrambling identities and different precoding matrixes for a macro eNB and a pico eNB on an ABS resource in a heterogeneous network according to an example embodiment of the present disclosure.

The example embodiment provides a method for information interaction and interference control between two TPs in a heterogeneous network scenario, the two TPs are a macro TP and a pico TP respectively, each TP supports two cells (i.e. component carriers), the method mainly refers to a method for avoiding interference in case of CA in a heterogeneous network deployment, interacted information is shared parameters of a high-power resource, and the high-power resource is a high-power cell in the two cells of the macro TP. FIG. 9 is a diagram showing adoption of different ports and different precoding matrixes for a macro eNB and a pico eNB on an ABS resource in a heterogeneous network according to an example embodiment of the present disclosure. FIG. 10 is a diagram showing adoption of different scrambling identities and different precoding matrixes for a macro eNB and a pico eNB on an ABS resource in a heterogeneous network according to an example embodiment of the present disclosure. As shown in FIG. 9 and FIG. 10, port8 is configured for the macro TP to transmit data on ABSs, port8 is configured for the pico TP to transmit data on the ABSs, $n_{SCID}$=0 is configured for the macro TP to transmit the data on the ABSs, and $n_{SCID}$=1 is configured for the pico TP to transmit the data on the ABSs. The method may include the following processing steps:

Step 1: in an interference coordination transmission system, a macro TP (TP A) sends shared parameters defined on a part of resources with highest power in all available resources to a pico TP B (i.e. an adjacent TP), wherein the part of resources with the highest power refer to resources of a high-power cell (component carrier) under a condition that the first TP is an eNB with multiple cells.

In the example embodiment, the shared parameters may be defined on a high-interference cell (i.e. component carrier) of the macro TP, and may include at least one of:

(1) N1 antenna port sequence numbers,
(2) N2 pieces of scrambling identity information,
(3) N3 total numbers of layers,
(4) N4 total numbers of antenna ports,
(5) N5 RIs, and
(6) N6 PMIs, where N1, N2, N3, N4, N5 and N6 are all positive integers more than or equal to 1.

In the example implementation process, the shared parameters may include: transmission port information defined on the high-interference cell of the macro TP, and may include: antenna port sequence number port=7, scrambling identity information $n_{SCID}=0$ and total layer number v=1 or 2; and in addition, the shared parameters may also include: channel related information defined on the high-interference cell of the macro TP, and may at least include the following contents: RI=1 and PMI including a set {$PMI_1, PMI_2, \ldots, PMI_k$} formed by multiple PMIs, wherein $PMI_1, PMI_2, \ldots, PMI_k$ are all positive integers more than or equal to 0.

In an example implementation mode of the present disclosure, the TP may send the shared parameters to the adjacent TP (i.e. the pico TP) through an X2 interface.

Step 2: the pico TP (i.e. the adjacent TP) selects an ICIC manner from a CA-based ICIC manner and a space-domain ICIC manner (i.e. a COMP technology) according to the shared parameters sent by the macro TP.

The pico TP may select the ICIC manner according to the shared parameters. Specifically, the pico TP judges whether a paired user may be found or not, a spatial channel of the paired user on the high-interference cell of the macro TP being required to be relatively orthogonal to a precoding matrix indicated by a PMI in the shared parameters sent by the macro TP. If the pico TP can find such a user, the space-domain ICIC manner (i.e. CS/CB for the COMP technology) may be selected, otherwise the CA-based ICIC manner may be selected. That the spatial channel is relatively orthogonal to the precoding matrix of the shared parameters refers to that their chordal distance is relatively long, for example: the chordal distance is more than 0.7, then the time-frequency resources for the pico TP to send data to the paired user may be overlapped with time-frequency resources for the macro TP to send data to a certain edge user, but they are still spatially relatively orthogonal, so that interference may be effectively suppressed, and system multiplexing efficiency may be improved.

Step 3: if the conventional ICIC manner is selected, the pico TP does not send the data on the cell (i.e. component carrier) with a carrier frequency the same as that of the high-interference cell of the macro TP or sends the data on a part of resources with lowest power in all the available resources of the first TP; and if the space-domain ICIC manner (for example: a CS/CB technology for downlink COMP) is selected, the pico TP may send the data on the cell (i.e. component carrier). However, when the pico TP sends the data to the paired user on the cell (i.e. component carrier), the pico TP should avoid use of antenna ports or scrambling identities in the shared parameters. In addition, when the pico TP sends the data to the paired user, a precoding weight relatively orthogonal to the precoding matrix indicated by the shared parameters is used, and is indicated by $PMI_0$, wherein $PMI_0$ is a positive integer more than or equal to 0.

In the example implementation process, as shown in FIG. 9, when the pico TP sends the data to the paired user on the cell (i.e. component carrier) with the carrier frequency the same as that of the high-interference cell of the macro TP, the macro TP adopts antenna port=8, scrambling identity information $n_{SCID}=0$, total layer number v=1 and PMI {$PMI_1, PMI_2, \ldots, PMI_k$} in the shared parameters; and then the pico TP should avoid use of antenna port=8, the pico TP actually uses antenna port=7, the other DMRS parameters are the same, for example: $n_{SCID}=0$ and total layer number v=1 in the shared parameters, and then it may be ensured that a DMRS of the pico TP and a DMRS of the macro TP are orthogonal to each other on the cell (i.e. component carrier). In addition, a precoding matrix indicated by $PMI_0$ is relatively orthogonal to a precoding matrix indicated by {$PMI_1, PMI_2, \ldots, PMI_k$} on a specific source subset of the cell (i.e. component carrier), so that data transmission of the pico TP may be ensured to be relatively orthogonal to data transmission of the macro TP on the cell (i.e. component carrier), and interference of data transmission of the pico TP to data transmission of the macro TP may be avoided. The other DMRS parameters may further include, but not limited to: a support maximum downlink bandwidth, a timeslot number in a radio frame and a frequency-domain index.

In the example implementation process, when the pico TP sends the data to the paired user on the cell (i.e. component carrier) with the carrier frequency the same as that of the high-interference cell of the macro TP, the macro TP adopts antenna port=7, antenna port=8, scrambling identity information $n_{SCID}=0$, total layer number v=2 and PMI {$PMI_1, PMI_2, \ldots, PMI_k$} in the shared parameters; then the pico TP should avoid use of scrambling identity information $n_{SCID}=1$, the pico TP actually uses scrambling identity information $n_{SCID}=0$, the other DMRS parameters are the same, for example: antenna port=7 and antenna port=8 are adopted by the two, and then it may be ensured that the DMRS of the pico TP and the DMRS of the macro TP are orthogonal to each other on the cell (i.e. component carrier). In addition, the precoding matrix indicated by $PMI_0$ is relatively orthogonal to the precoding matrix indicated by {$PMI_1, PMI_2, \ldots, PMI_k$} on the specific source subset of the cell (i.e. component carrier), so that data transmission of the pico TP may be ensured to be relatively orthogonal to data transmission of the macro TP on the cell (i.e. component carrier), and interference of data transmission of the pico TP to data transmission of the macro TP may be avoided.

In the example implementation process, downlink COMP refers to multi-TP CS-CB, DPS, PB or JT.

In the example implementation process, each TP may be one of: an eNB, a macro eNB, a pico eNB and a relay station.

By the steps provided by the example embodiment, for a heterogeneous network, an eNB may perform semi-static switching between time-domain ICIC and space-domain ICIC (for example: CS/CB for COMP), so that a space-domain ICIC supporting method (i.e. the COMP technology) and an signalling interaction method supporting the function are disclosed on the basis of a conventional eICIC method, and the advantage of improving system spectral efficiency and system performance is achieved; and in addition, compatibility with cell-specific shared parameter signalling with lower overhead in a basic design of existing signalling may also be achieved, and the advantages of high compatibility and low signalling overhead are ensured.

Example Embodiment 5

The example embodiment provides a method for information interaction and interference control between two eNBs in a heterogeneous network scenario, interacted information is shared parameters of low-power resources, two TPs are a macro TP and a pico TP respectively, and the low-power resources are ABS resources of the macro TP. The method may include the following processing steps:

Step 1: in an interference coordination transmission system, a macro TP (TP A) sends shared parameters defined on a part of resources with lowest power in all available resources to a pico TP B (i.e. an adjacent TP), wherein the part of resources with the lowest power refer to a part of low-power resources of the corresponding macro TP, i.e. an ABS set.

In the example embodiment, the shared parameters may be defined on time resources of the ABS set of the macro TP, and may include at least one of:
(1) N1 antenna port sequence numbers,
(2) N2 pieces of scrambling identity information,
(3) N3 total numbers of layers,
(4) N4 total numbers of antenna ports,
(5) N5 RIs, and
(6) N6 PMIs,
where N1, N2, N3, N4, N5 and N6 are all positive integers more than or equal to 1.

In the example embodiment, the shared parameters may include transmission port information defined on the ABS set of the macro TP, and may include: antenna port sequence number port=7, scrambling identity information $n_{SCID}=0$ and total layer number v=1 or 2; and in addition, the shared parameters may also include: channel related information defined on the ABS set of the macro TP, and may at least include the following contents: RI=1 and PMI including a set $\{PMI_1, PMI_2, \ldots, PMI_k\}$ formed by multiple PMIs, wherein $PMI_1, PMI_2, \ldots, PMI_k$ are all positive integers more than or equal to 1.

In an example embodiment, the macro TP may send the shared parameters to the adjacent TP (i.e. the pico TP) through an X2 interface.

Step 2: like under a condition that a conventional ICIC manner is selected, the pico TP sends data on the ABS set specified by the macro TP; moreover, a space-domain ICIC manner (i.e. a CS/CB technology for downlink COMP) is selected to further reduce inter-cell interference, and specifically, when the pico TP sends the data to a paired user on the ABS set specified by the macro TP, the pico TP should avoid use of antenna ports or scrambling identities in the shared parameters. In addition, when the pico TP sends the data to the paired user, a precoding weight relatively orthogonal to a precoding matrix indicated by the shared parameters is used, and is indicated by $PMI_0$, wherein $PMI_0$ is a positive integer more than or equal to 0.

In the example implementation process, as shown in FIG. 9, when the pico TP sends the data to the paired user on the ABS set specified by the macro TP, the macro TP still has data to be transmitted on the ABS set, but data transmission is limited, and the macro TP is required to adopt antenna port=8, scrambling identity information $n_{SCID}=0$, total layer number v=1 and PMI $\{PMI_1, PMI_2, \ldots, PMI_k\}$ in the shared parameters for data transmission on the ABS set; and then the pico TP should avoid use of antenna port=8, the pico TP actually uses port 7, the other DMRS parameters are the same, for example: $n_{SCID}=0$ and total layer number v=1 in the shared parameters, and then it may be ensured that a DMRS of the pico TP and a DMRS of the macro TP are orthogonal to each other on the ABS set. In addition, a precoding matrix indicated by $PMI_0$ is relatively orthogonal to a precoding matrix indicated by $\{PMI_1, PMI_2, \ldots, PMI_k\}$ on a specific source subset of the ABS set, so that data transmission of the pico TP may be ensured to be relatively orthogonal to data transmission of the macro TP on the specific resource subset of the ABS set, and mutual interference of data transmission of the macro TP and data transmission of the pico TP may be avoided. The other DMRS parameters may further include, but not limited to: a support maximum downlink bandwidth, a timeslot number in a radio frame and a frequency-domain index.

In the example implementation process, as shown in FIG. 10, when the pico TP sends the data to the paired user on the ABS set specified by the macro TP, the macro TP still has data to be transmitted on the ABS set, but data transmission is limited, and the macro TP adopts antenna port=7 and 8, scrambling identity information $n_{SCID}=0$, total layer number v=2 and PMI $\{PMI_1, PMI_2, \ldots, PMI_k\}$ in the shared parameters for data transmission on the ABS set; and then the pico TP should avoid use of scrambling identity information $n_{SCID}=1$, the pico TP actually uses scrambling identity information $n_{SCID}=0$, the other DMRS parameters are the same, for example: ports 7 and 8 are adopted by the two, and then it may be ensured that the DMRS of the pico TP and the DMRS of the macro TP are orthogonal to each other on the ABS set. In addition, the precoding matrix indicated by $PMI_0$ is relatively orthogonal to the precoding matrix indicated by $\{PMI_1, PMI_2, \ldots, PMI_k\}$ on the specific source subset of the ABS set, so that data transmission of the macro TP may be ensured to be relatively orthogonal to data transmission of the pico TP on the ABS set, and mutual interference of data transmission of the macro TP and data transmission of the pico TP may be avoided.

In the example implementation process, downlink COMP refers to multi-TP CS-CB, DPS, PB or JT.

In the example implementation process, each TP may be one of: an eNB, a macro eNB, a pico eNB and a relay station.

By the steps provided by the example embodiment, an eNB may adopt space-domain ICIC on the basis of conventional time-domain ICIC to further enhance interference coordination performance by adopting the low-power shared parameters provided by the embodiment of the disclosure, and the advantage of improving system spectral efficiency and system performance is achieved; and in addition, compatibility with cell-specific shared parameter signalling with lower overhead in a basic design of existing signalling may also be achieved, and the advantages of high compatibility and low signalling overhead are ensured.

Example Embodiment 6

The example embodiment provides a method for information interaction and interference control between two TPs in a heterogeneous network scenario, the two TPs are a macro TP and a pico TP respectively, each TP supports two cells (i.e. component carriers), the method mainly refers to a method for avoiding interference in case of CA in a heterogeneous network deployment, interacted information is shared parameters of a low-power resource, and the high-power resource is a low-power cell in the two cells of the macro TP. The method may include the following processing steps:

Step 1: in an interference coordination transmission system, a macro TP (TP A) sends shared parameters defined on a part of resources with lowest power in all available resources to a pico TP B (i.e. an adjacent TP), wherein the part of resources with the lowest power refer to resources of a low-power cell (component carrier) under a condition that the first TP is an eNB with multiple cells.

In the example embodiment, the shared parameters may be defined on a high-interference cell (i.e. component carrier) of the macro TP, and may include at least one of:
(1) N1 antenna port sequence numbers,
(2) N2 pieces of scrambling identity information,
(3) N3 total numbers of layers,
(4) N4 total numbers of antenna ports,
(5) N5 RIs, and
(6) N6 PMIs, where N1, N2, N3, N4, N5 and N6 are all positive integers more than or equal to 1.

In the example implementation process, the shared parameters may include: transmission port information defined on the high-interference cell of the macro TP, and may include: antenna port sequence number port=7, scrambling identity information $n_{SCID}=0$ and total layer number v=1 or 2; and in addition, the shared parameters may also include: channel related information defined on the high-interference cell of the macro TP, and may at least include the following contents: RI=1 and PMI including a set {$PMI_1$, $PMI_2$, ..., $PMI_k$} formed by multiple PMIs, wherein $PMI_1$, $PMI_2$, ..., $PMI_k$ are all positive integers more than or equal to 0.

In an example embodiment, the TP may send the shared parameters to the adjacent TP (i.e. the pico TP) through an X2 interface.

Step 2: like under a condition that a conventional ICIC manner is selected, the pico TP may send data on the low-power cell (i.e. component carrier) of the macro TP; moreover, a space-domain ICIC manner (i.e. a CS/CB technology for downlink COMP) is selected to further reduce inter-cell interference, and specifically, when the pico TP sends the data to a paired user on the cell (i.e. component carrier), the pico TP should avoid use of antenna ports or scrambling identities in the shared parameters. In addition, when the pico TP sends the data to the paired user, a precoding weight relatively orthogonal to a precoding matrix indicated by the shared parameters is used, and is indicated by $PMI_0$, wherein $PMI_0$ is a positive integer more than or equal to 0.

In the example implementation process, as shown in FIG. 9, when the pico TP sends the data to the paired user on the cell (i.e. component carrier) with a carrier frequency the same as that of the high-interference cell of the macro TP, the macro TP still has data to be transmitted on the low-power cell, but data transmission is limited, and the macro TP is required to adopt antenna port=8, scrambling identity information $n_{SCID}=0$, total layer number v=1 and PMI {$PMI_1$, $PMI_2$, ..., $PMI_k$} in the shared parameters for data transmission on the cell; and then the pico TP should avoid use of antenna port 8, the pico TP actually uses antenna port 7, the other DMRS parameters are the same, for example: $n_{SCID}=0$ and total layer number v=1 in the shared parameters, and then it may be ensured that a DMRS of the pico TP and a DMRS of the macro TP are orthogonal to each other on the cell (i.e. component carrier). In addition, a precoding matrix indicated by $PMI_0$ is relatively orthogonal to a precoding matrix indicated by {$PMI_1$, $PMI_2$, ..., $PMI_k$} on a specific source subset of the cell (i.e. component carrier), so that data transmission of the pico TP may be ensured to be relatively orthogonal to data transmission of the macro TP on the cell (i.e. component carrier), and interference of data transmission of the pico TP to data transmission of the macro TP may be avoided. The other DMRS parameters may further include, but not limited to: a support maximum downlink bandwidth, a timeslot number in a radio frame and a frequency-domain index.

In the example implementation process, when the pico TP sends the data to the paired user on the cell (i.e. component carrier) with the carrier frequency the same as that of the high-interference cell of the macro TP, the macro TP still has data to be transmitted on the cell, but data transmission is limited, and the macro TP is required to adopt antenna port=7 and 8, scrambling identity information $n_{SCID}=0$, total layer number v=2 and PMI {$PMI_1$, $PMI_2$, ..., $PMI_k$} in the shared parameters for data transmission on the low-power cell; and then the pico TP should avoid use of scrambling identity information $n_{SCID}=1$, the pico TP actually uses scrambling identity information $n_{SCID}=0$, the other DMRS parameters are the same, for example: antenna ports 7 and 8 are adopted by the two, and then it may be ensured that the DMRS of the pico TP and the DMRS of the macro TP are orthogonal to each other on the cell (i.e. component carrier). In addition, the precoding matrix indicated by $PMI_0$ is relatively orthogonal to the precoding matrix indicated by {$PMI_1$, $PMI_2$, ..., $PMI_k$} on the specific source subset of the cell (i.e. component carrier), so that data transmission of the pico TP may be ensured to be relatively orthogonal to data transmission of the macro TP on the cell (i.e. component carrier), and interference of data transmission of the pico TP to data transmission of the macro TP may be avoided.

In the example implementation process, downlink COMP refers to multi-TP CS-CB, DPS, PB or JT.

In the example implementation process, each TP may be one of: an eNB, a macro eNB, a pico eNB and a relay station.

By the steps provided by the example embodiment, the following technical effects are achieved: an eNB may adopt space-domain ICIC on the basis of conventional CA-based ICIC to further enhance interference coordination performance by adopting the low-power shared parameters provided by the embodiment of the present disclosure; the method of the embodiment of the present disclosure has the advantage of improving system spectral efficiency and system performance is achieved; and in addition, compatibility with cell-specific shared parameter signalling with lower overhead in a basic design of existing signalling may also be achieved, and the advantages of high compatibility and low signalling overhead are ensured.

Device Embodiment

Figure 11:
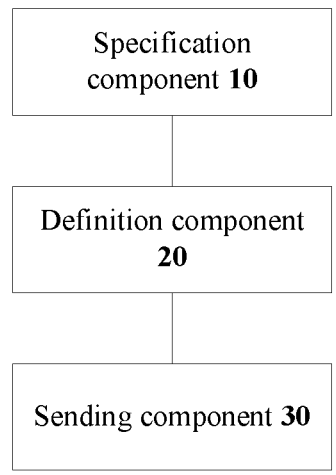
FIG. 11 is a structure diagram of a parameter transmission device for interference coordination according to an embodiment of the present disclosure.

FIG. 11 is a structure diagram of a parameter transmission device for interference coordination according to an embodiment of the present disclosure. As shown in FIG. 11, the parameter transmission device for interference coordination is applied to a first TP, and the device may include: a specification component 10, configured to specify a part of resources in all currently available resources of the first TP; a definition component 20, configured to define a set of shared parameters on the specified part of resources, wherein the set of shared parameters may be used for performing interference coordination between the first TP and at least one second TP adjacent to the first TP; and a sending component 30, configured to send the set of shared parameters to the at least one second TP.

By the device shown in FIG. 11, the problem that there is no technical solution simultaneously supporting integration of a conventional ICIC technology and a COMP technology under a non-ideal backhaul condition in the related technology is solved, and a capability of interference coordination between the TPs is further enhanced by space-domain ICIC on the basis of the conventional ICIC technology.

In an example embodiment, the specified part of resources may include one of:

(1) a preset subframe set of the first TP, wherein the preset subframe set is one of: an ABS set and a non-ABS set, and the available resources of the first TP are composed of all subframes;

(2) all PRBs, of which RNTP values adopt a preset numerical value, of the first TP, wherein the preset numerical value is 0 or 1, and the available resources of the first TP are composed of all available PRBs of the first TP; and (3) one cell, specified by the first TP, in multiple cells belonging to the first TP, wherein the available resources of the first TP are composed of all cells belonging to the first TP, and each cell actually corresponds to a component carrier in CA.

In an example embodiment, the set of shared parameters are information defined by the first TP on the specified part of resources, wherein the information may include at least one of:

(1) N1 antenna port sequence numbers,
(2) N2 pieces of scrambling identity information,
(3) N3 total numbers of layers,
(4) N4 total numbers of antenna ports,
(5) N5 RIs, and
(6) N6 PMIs.

N1, N2, N3, N4, N5 and N6 may all be positive integers more than or equal to 1.

In an example embodiment, the sending component 30 is configured to send the set of shared parameters to the at least one second TP through an X2 interface.

In an example embodiment, the first TP or the second TP may be one of:
(1) an eNB,
(2) a macro eNB,
(3) a pico eNB, and
(4) a relay station.

Figure 12:
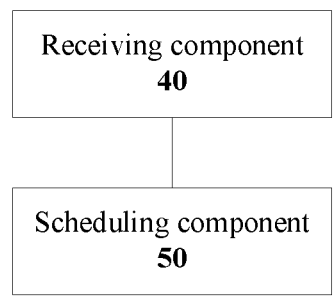
FIG. 12 is a structure diagram of an interference coordination device according to an embodiment of the present disclosure.

FIG. 12 is a structure diagram of an interference coordination device according to an embodiment of the present disclosure. As shown in FIG. 12, the interference coordination device is applied to a second TP, and the device may include: a receiving component 40, configured to receive a set of shared parameters from a first TP, wherein the second TP may be adjacent to the first TP, the set of shared parameters may be a parameter information set defined on a specified part of resources after the first TP specifies the part of resources in all available resources of the first TP, and the set of shared parameters may be used for performing interference coordination between the first TP and the second TP; and a scheduling component 50, configured to schedule a user terminal managed by the second TP according to the set of shared parameters.

By the device shown in FIG. 12, the problem that there is no technical solution simultaneously supporting integration of a conventional ICIC technology and a COMP technology under a non-ideal backhaul condition in the related technology is solved, and a capability of interference coordination between the TPs is further enhanced by space-domain ICIC on the basis of the conventional ICIC technology.

In an example embodiment, the specified part of resources may include one of:

(1) a preset subframe set of the first TP, wherein the preset subframe set is one of: an ABS set and a non-ABS set, and the available resources of the first TP are composed of all subframes;
(2) all PRBs, of which RNTP values adopt a preset numerical value, of the first TP, wherein the preset numerical value is 0 or 1, and the available resources of the first TP are composed of all available PRBs of the first TP; and
(3) one cell, specified by the first TP, in multiple cells belonging to the first TP, wherein the available resources of the first TP are composed of all cells belonging to the first TP, and each cell actually corresponds to a component carrier in CA.

In an example embodiment, the set of shared parameters are information defined by the first TP on the specified part of resources, wherein the information may include at least one of:

(1) N1 antenna port sequence numbers,
(2) N2 pieces of scrambling identity information,
(3) N3 total numbers of layers,
(4) N4 total numbers of antenna ports,
(5) N5 RIs, and
(6) N6 PMIs.

N1, N2, N3, N4, N5 and N6 may all be positive integers more than or equal to 1.

Figure 13:
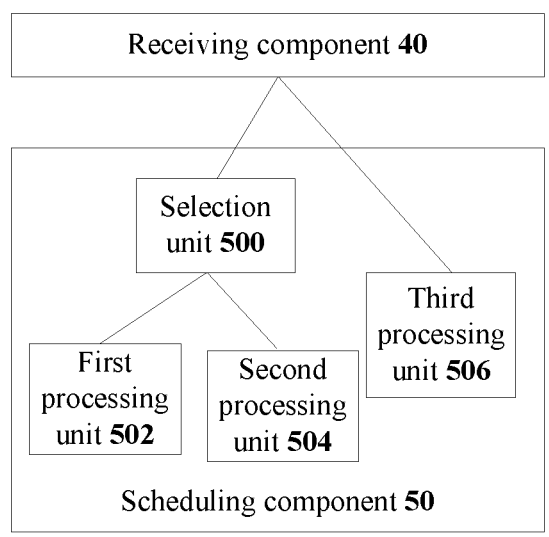
FIG. 13 is a structure diagram of an interference coordination device according to an example embodiment of the present disclosure.

In an example embodiment, as shown in FIG. 13, the scheduling component 50 may include: a selection unit 500, configured to select an ICIC manner from a time-domain or frequency-domain ICIC manner and a space-domain ICIC manner; a first processing unit 502, configured to, under a condition that the time-domain or frequency-domain ICIC manner is selected, not send data on the specified part of resources or send data to the user terminal on a part of resources with lowest power in all the available resources of the first TP, wherein the specified part of resources is a part of resources with highest resources in all the available resources of the first TP; and a second processing unit 504, configured to, under a condition that the space-domain ICIC manner is selected, send data to the user terminal on the specified part of resources, wherein use of antenna port sequence numbers or scrambling identity information in the set of shared parameters and precoding matrixes approximately orthogonal to precoding matrixes indicated by precoding weights may be avoided when the data is sent.

In an example implementation process, the part of resources with the highest power may be one of: the non-ABS set, resource blocks with RNTP of 1 and a cell with highest power.

In an example embodiment, as shown in FIG. 13, the scheduling component 50 may include: a third processing unit 506, configured to send data to the user terminal on the specified part of resources, and perform space-domain ICIC processing in a data sending process, wherein the specified part of resources is the part of resources with the lowest power in all the available resources of the first TP, and use of antenna port sequence numbers or scrambling identity information in the set of shared parameters and the precoding matrixes orthogonal to the precoding matrixes indicated by the precoding weights may be avoided when the data is sent.

In the example implementation process, the part of resources with the lowest power may be one of: the ABS set, resource blocks with RNTP of 0 and a cell with lowest power.

In an example embodiment, the receiving component 40 is configured to receive the set of shared parameters from the first TP through an X2 interface.

In an example embodiment, the first TP or the second TP may be one of:
(1) an eNB,
(2) a macro eNB,
(3) a pico eNB, and
(4) a relay station.

It is important to note that each component in the device embodiment and an example working mode for interaction of each component are applicable to various application scenarios mentioned in example embodiment 1 to example embodiment 6, and will not be elaborated herein.

From the above, it can be seen that the device of the embodiment achieves the following technical effects (it is important to note that these effects are effects which may be achieved by some example embodiments) that: with adoption of the high-power shared parameters provided by the embodiment of the present disclosure, if the shared parameters are defined on the part of high-power resources, an eNB in a heterogeneous network may perform semi-static switching between time-domain ICIC or CA-based ICIC and space-domain ICIC (for example: CS/CB for COMP); for a homogeneous network, the eNB may perform semi-static switching between frequency-domain ICIC and space-domain ICIC (for example: CS/CB for COMP); an eNB in a homogeneous network may perform semi-static switching between frequency-domain ICIC and space-domain ICIC (for example: CS/CB for COMP); the technical solutions provided by the present disclosure disclose an ICIC method capable of semi-statically switch conventional time-domain ICIC and space-domain ICIC and an signalling interaction method supporting the function on the basis of a conventional eICIC method. Or, if the shared parameters are defined on the part of low-power resources, an eNB may further adopt space-domain ICIC on the basis of conventional ICIC to further enhance interference coordination performance by adopting the low-power shared parameters provided by the embodiment of the present disclosure.

Obviously, those skilled in the art should know that each component or step of the embodiment of the present disclosure may be implemented by a universal computing device, and the components or steps may be concentrated on a single computing device or distributed on a network formed by a plurality of computing devices, and can optionally be implemented by programmable codes executable for the computing devices, so that the components or steps may be stored in a storage device for execution with the computing devices, and under certain conditions, the shown or described steps may be executed in a sequence different from that described here, or the components or steps may form each integrated circuit component respectively, or multiple components or steps therein may form a single integrated circuit component for implementation. As a consequence, the present disclosure is not limited to any specific hardware and software combination.

The above is only the example embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the appended claims of the present disclosure.

INDUSTRIAL APPLICABILITY

As mentioned above, the parameter transmission method and device for interference coordination and interference coordination method and device provided by the embodiments of the present disclosure have a beneficial effect as follows: space-domain ICIC may be adopted on the basis of a conventional ICIC technology to further enhance a capability of interference coordination between TPs.

What is claimed is:

1. A parameter transmission method for interference coordination, applied to a first Transmission Point (TP), the method comprising:
   specifying, by the first TP, a part of resources in all available resources of the first TP;
   defining, by the first TP, a set of shared parameters on the specified part of resources, wherein the set of shared parameters are used for performing interference coordination between the first TP and at least one second TP adjacent to the first TP; and
   sending, by the first TP, the set of shared parameters to the at least one second TP;
   wherein the set of shared parameters is information defined on the specified part of resources by the first TP, wherein the information comprises at least one of: N5 Rank Indications (RIs), and N6 Precoding Matrix Indicators (PMIs); where N5 and N6 are all positive integers more than or equal to 1;
   wherein the specified part of resources comprise one of: a preset subframe set of the first TP, wherein the preset subframe set is one of: an Almost Blank Subframe (ABS) set and a non-ABS set, and the available resources of the first TP are composed of all subframes; and one cell, specified by the first TP, in multiple cells belonging to the first TP, wherein the available resources of the first TP are composed of all cells belonging to the first TP.

2. The method as claimed in claim 1, wherein the first TP sends the set of shared parameters to the at least one second TP through an X2 interface.

3. The method as claimed in claim 2, wherein the first TP sends the set of shared parameters to the at least one second TP through an Information Element (IE) item configured in a LOAD INFORMATION message of the X2 interface.

4. The method as claimed in claim 1, wherein the first TP or the second TP is one of: an Evolved Node B (eNB), a macro eNB, a pico eNB and a relay station.

5. An interference coordination method, applied to a second Transmission Point (TP), the method comprising:
   receiving, by the second TP, a set of shared parameters from a first TP, wherein the second TP is adjacent to the first TP, the set of shared parameters is a parameter information set defined on a specified part of resources after the first TP specifies the part of resources in all available resources of the first TP, and the set of shared parameters are used for performing interference coordination between the first TP and the second TP; and
   scheduling, by the second TP, a user terminal managed by the second TP according to the set of shared parameters;
   wherein the set of shared parameters is information defined on the specified part of resources by the first TP, wherein the information comprises at least one of: N5 Rank Indications (RIs), and N6 Precoding Matrix Indicators (PMIs); where N5 and N6 are all positive integers more than or equal to 1;
   wherein the specified part of resources comprise one of: a preset subframe set of the first TP, wherein the preset subframe set is one of: an Almost Blank Subframe (ABS) set and a non-ABS set, and the available resources of the first TP are composed of all subframes; and one cell, specified by the first TP, in multiple cells belonging to the first TP, wherein the available resources of the first TP are composed of all cells belonging to the first TP.

6. The method as claimed in claim 5, wherein the second TP receives the set of shared parameters from the first TP through an X2 interface.

7. The method as claimed in claim 6, wherein the second TP receives the set of shared parameters from the first TP through an Information Element (IE) item configured in a LOAD INFORMATION message of the X2 interface.

8. The method as claimed in claim 5, wherein the first TP or the second TP is one of: an Evolved Node B (eNB), a macro eNB, a pico eNB and a relay station.

9. The method as claimed in claim 5, wherein the specified part of resources is a part of resources with highest power in all the available resources of the first TP, and scheduling, by the second TP, the user terminal managed by the second TP according to the set of shared parameters comprises:

selecting, by the second TP, an Inter-Cell Interference Coordination (ICIC) manner from a time-domain or frequency-domain ICIC manner and a space-domain ICIC manner;

under a condition that the time-domain or frequency-domain ICIC manner is selected, not sending, by the second TP, data on the specified part of resources or sending, by the second TP, data to the user terminal on a part of resources with lowest power in all the available resources of the first TP; and under a condition that the space-domain ICIC manner is selected, sending, by the second TP, data to the user terminal on the specified part of resources, wherein when sending the data, the second TP avoids use of antenna port sequence numbers or scrambling identity information in the set of shared parameters, or the second TP uses the precoding matrixes approximately orthogonal to precoding matrixes indicated by precoding weights.

10. The method as claimed in claim 9, wherein the part of resources with the highest power is one of: the non-ABS set, resource blocks with RNTP of 1 and a cell with highest power.

11. The method as claimed in claim 5, wherein the specified part of resources is the part of resources with lowest power in all the available resources of the first TP, and scheduling, by the second TP, the user terminal managed by the second TP according to the set of shared parameters comprises:

sending, by the second TP, data to the user terminal on the specified part of resources, and performing space-domain ICIC processing in a data sending process, wherein when sending the data, the second TP avoids use of antenna port sequence numbers or scrambling identity information in the set of shared parameters, or the second TP uses the precoding matrixes orthogonal to the precoding matrixes indicated by the precoding weights.

12. The method as claimed in claim 11, wherein the part of resources with the lowest power is one of: the ABS set, resource blocks with RNTP of 0 and a cell with lowest power.

13. A parameter transmission device for interference coordination, applied to a first Transmission Point (TP), the device comprising:

a specification component, configured to specify a part of resources in all currently available resources of the first TP;

a definition component, configured to define a set of shared parameters on the specified part of resources, wherein the set of shared parameters are used for performing interference coordination between the first TP and at least one second TP adjacent to the first TP; and a sending component, configured to send the set of shared parameters to the at least one second TP;

wherein the set of shared parameters is information defined on the specified part of resources by the first TP, wherein the information comprises at least one of: N5 Rank Indications (RIs), and N6 Precoding Matrix Indicators (PMIs); where N5 and N6 are all positive integers more than or equal to 1;

wherein the specified part of resources comprise one of: a preset subframe set of the first TP, wherein the preset subframe set is one of: an Almost Blank Subframe (ABS) set and a non-ABS set, and the available resources of the first TP are composed of all subframes; and one cell, specified by the first TP, in multiple cells belonging to the first TP, wherein the available resources of the first TP are composed of all cells belonging to the first TP.

14. The device as claimed in claim 13, wherein the sending component is configured to send the set of shared parameters to the at least one second TP through an X2 interface.

15. The device as claimed in claim 13, wherein the first TP or the second TP is one of: an Evolved Node B (eNB), a macro eNB, a pico eNB and a relay station.

16. An interference coordination device, applied to a second Transmission Point (TP), the device comprising:

a receiving component, configured to receive a set of shared parameters from a first TP, wherein the second TP is adjacent to the first TP, the set of shared parameters is a parameter information set defined on a specified part of resources after the first TP specifies the part of resources in all available resources of the first TP, and the set of shared parameters are used for performing interference coordination between the first TP and the second TP; and a scheduling component, configured to schedule a user terminal managed by the second TP according to the set of shared parameters;

wherein the set of shared parameters is information defined on the specified part of resources by the first TP, wherein the information comprises at least one of: N5 Rank Indications (RIs), and N6 Precoding Matrix Indicators (PMIs); where N5 and N6 are all positive integers more than or equal to 1;

wherein the specified part of resources comprise one of: a preset subframe set of the first TP, wherein the preset subframe set is one of: an Almost Blank Subframe (ABS) set and a non-ABS set, and the available resources of the first TP are composed of all subframes; and one cell, specified by the first TP, in multiple cells belonging to the first TP, wherein the available resources of the first TP are composed of all cells belonging to the first TP.

17. The device as claimed in claim 16, wherein the receiving component is configured to receive the set of shared parameters from the first TP through an X2 interface.

18. The device as claimed in claim 16, wherein the first TP or the second TP is one of: an Evolved Node B (eNB), a macro eNB, a pico eNB and a relay station.

19. The device as claimed in claim 16, wherein the scheduling component comprises:

a selection unit, configured to select an Inter-Cell Interference Coordination (ICIC) manner from a time-domain or frequency-domain ICIC manner and a space-domain ICIC manner;

a first processing unit, configured to, under a condition that the time-domain or frequency-domain ICIC manner is selected, not send data on the specified part of resources or send data to the user terminal on a part of resources with lowest power in all the available resources of the first TP; and a second processing unit, configured to, under a condition that the space-domain ICIC manner is selected, send data to the user terminal on the specified part of resources, wherein the specified part of resources is a part of resources with highest power in all the available resources of the first TP, and use of antenna port sequence numbers or scrambling identity information in the set of shared parameters and precoding matrixes approximately orthogonal to precoding matrixes indicated by precoding weights is avoided when the data is sent.

20. The device as claimed in claim 19, wherein the part of resources with the highest power is one of: the non-ABS set, resource blocks with RNTP of 1 and a cell with highest power.

21. The device as claimed in claim 16, wherein the scheduling component comprises:
  a third processing unit, configured to send data to the user terminal on the specified part of resources, and perform space-domain ICIC processing in a data sending process, wherein the specified part of resources is the part of resources with the lowest power in all the available resources of the first TP, and avoid use of antenna port sequence numbers or scrambling identity information in the set of shared parameters, or use the precoding matrixes orthogonal to the precoding matrixes indicated by the precoding weights when the data is sent.

22. The device as claimed in claim 21, wherein the part of resources with the lowest power is one of: the ABS set, resource blocks with RNTP of 0 and a cell with lowest power.

* * * * *